US012191710B2

(12) United States Patent
Beyerl et al.

(10) Patent No.: US 12,191,710 B2
(45) Date of Patent: Jan. 7, 2025

(54) ELECTRIC MOTOR FOR A POWER TOOL

(71) Applicant: MILWAUKEE ELECTRIC TOOL CORPORATION, Brookfield, WI (US)

(72) Inventors: Andrew T. Beyerl, Pewaukee, WI (US); Derek J. Schwab, Glendale, WI (US); Samantha L. Billetdeaux, New Berlin, WI (US); Kyle Greunke, Auborndale, WI (US); Hans T. Banholzer, Mequon, WI (US); Carmen J. Castanos, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/366,378

(22) Filed: Aug. 7, 2023

(65) Prior Publication Data

US 2023/0387734 A1 Nov. 30, 2023

Related U.S. Application Data

(63) Continuation of application No. 17/165,023, filed on Feb. 2, 2021, now Pat. No. 11,728,700.
(Continued)

(51) Int. Cl.
*H02K 1/18* (2006.01)
*B25F 5/00* (2006.01)
(Continued)

(52) U.S. Cl.
CPC ............. *H02K 1/185* (2013.01); *B25F 5/008* (2013.01); *H02K 5/161* (2013.01); *H02K 7/083* (2013.01);
(Continued)

(58) Field of Classification Search
CPC ........ H02K 1/185; H02K 11/33; H02K 9/227; H02K 7/083; H02K 21/16
(Continued)

(56) References Cited

U.S. PATENT DOCUMENTS 3,699,366 A 10/1972 Wood
4,795,931 A 1/1989 Sturm
(Continued)

FOREIGN PATENT DOCUMENTS

EP 1760861 B1 10/2010
EP 3166213 A2 5/2017

OTHER PUBLICATIONS

International Search Report and Written Opinion for Application No. PCT/US2021/016140 dated May 20, 2021 (10 pages).

*Primary Examiner* — Jose A Gonzalez Quinones
(74) *Attorney, Agent, or Firm* — Michael Best & Friedrich LLP

(57) ABSTRACT

An electric motor assembly includes a circuit board, a rotor assembly, and a stator assembly having a first end coupled to the circuit board and a second end opposite the first end. The stator assembly also includes an annular stator body having a plurality of inwardly projecting teeth. The stator assembly further includes windings wrapped about the stator body to form a plurality of coils. The stator assembly also includes a terminal coupled to an outer periphery of the stator body and extending longitudinally between the first end and the second end. The terminal is coupled to the circuit board at the first end and is coupled to the windings at the second end to electrically connect the windings to the circuit board. The terminal is molded to an attachment member, and the attachment member is molded to the outer periphery of the stator body.

20 Claims, 19 Drawing Sheets

Related U.S. Application Data

(60) Provisional application No. 62/970,272, filed on Feb. 5, 2020.

(51) Int. Cl.
    *H02K 5/16*     (2006.01)
    *H02K 7/08*     (2006.01)
    *H02K 7/14*     (2006.01)
    *H02K 9/22*     (2006.01)
    *H02K 11/33*     (2016.01)
    *H02K 21/16*     (2006.01)
    *B23D 51/16*     (2006.01)

(52) U.S. Cl.
    CPC ............ *H02K 7/145* (2013.01); *H02K 9/227* (2021.01); *H02K 11/33* (2016.01); *H02K 21/16* (2013.01); *B23D 51/16* (2013.01); *H02K 2211/03* (2013.01)

(58) Field of Classification Search
    USPC ............................................ 310/50, 216.049
    See application file for complete search history.

(56) References Cited

U.S. PATENT DOCUMENTS

| | | |
|---|---|---|
| 2015/0282337 A1 | 10/2015 | Ekstrom et al. |
| 2016/0233730 A1 | 8/2016 | Ho |
| 2016/0336831 A1* | 11/2016 | Horizumi ............... H02K 11/33 |
| 2016/0359392 A1 | 12/2016 | Mergener et al. |
| 2017/0110946 A1* | 4/2017 | Oktavec ................ H02K 7/145 |
| 2019/0190351 A1 | 6/2019 | Gregorich et al. |

* cited by examiner

ELECTRIC MOTOR FOR A POWER TOOL

CROSS-REFERENCE TO RELATED APPLICATIONS

This application is a continuation of U.S. patent application Ser. No. 17/165,023, filed Feb. 2, 2021, now U.S. Pat. No. 11,728,700, which claims priority to U.S. Provisional Patent Application No. 62/970,272, filed Feb. 5, 2020, the entire contents of all of which is hereby incorporated by reference.

FIELD OF THE INVENTION

The present invention relates to tools, such as power tools, and more particularly to power tools including an electric motor.

BACKGROUND OF THE INVENTION

Tools, such as power tools, can include an electric motor supported within a housing of the tool.

SUMMARY OF THE INVENTION

In one construction, an electric motor assembly includes a circuit board, a rotor assembly, and a stator assembly having a first end coupled to the circuit board and a second end opposite the first end. The stator assembly also includes an annular stator body having a plurality of inwardly projecting teeth. The stator assembly further includes windings wrapped about the stator body to form a plurality of coils. The stator assembly also includes a terminal coupled to an outer periphery of the stator body and extending longitudinally between the first end and the second end. The terminal is coupled to the circuit board at the first end and is coupled to the windings at the second end to electrically connect the windings to the circuit board. The terminal is molded to an attachment member, and the attachment member is molded to the outer periphery of the stator body.

In another construction, an electric motor assembly includes a circuit board, a rotor assembly, and a stator assembly having a first end coupled to the circuit board and a second end opposite the first end. The stator assembly also includes an annular stator body having a plurality of inwardly projecting teeth. The stator assembly further includes windings wrapped about the stator body to form a plurality of coils. The stator assembly also includes a terminal coupled to an outer periphery of the stator body and extending longitudinally between the first end and the second end. The terminal is coupled to the circuit board at the first end and is coupled to the windings at the second end to electrically connect the windings to the circuit board. The terminal is molded to an attachment member, and the attachment member is molded to the outer periphery of the stator body.

In another construction, an electric motor assembly includes a circuit board, a rotor assembly, and a stator assembly. The stator assembly has a first end coupled to the circuit board and a second end opposite the first end. The stator assembly includes a stator body having a plurality of teeth, windings wrapped about the stator body to form a plurality of coils, and a terminal coupled to an outer periphery of the stator body and extending longitudinally between the first end and the second end. The terminal is coupled to the circuit board at the first end and is coupled to the windings at the second end to electrically connect the windings to the circuit board. The electric motor assembly also includes a heat sink positioned between the stator assembly and the circuit board. The heat sink is in thermal contact with the circuit board.

Other aspects of the application will become apparent by consideration of the detailed description and accompanying drawings.

Before any embodiments of the application are explained in detail, it is to be understood that the application is not limited in its application to the details of construction and the arrangement of components set forth in the following description or illustrated in the following drawings. The application is capable of other embodiments and of being practiced or of being carried out in various ways.

DETAILED DESCRIPTION

Figure 1:
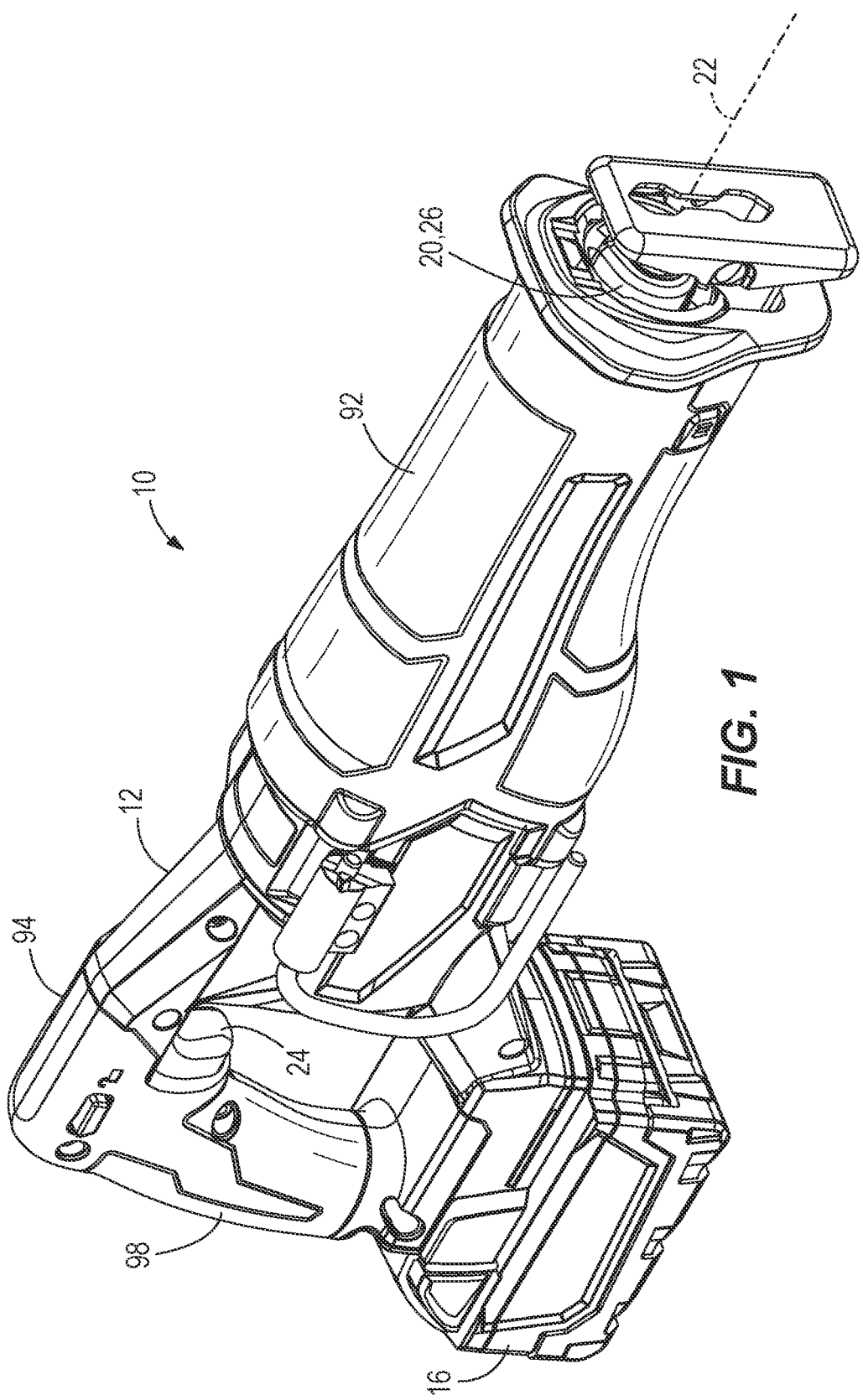
FIG. 1 is a perspective view of a power tool according to an embodiment of the invention.
Figure 2:
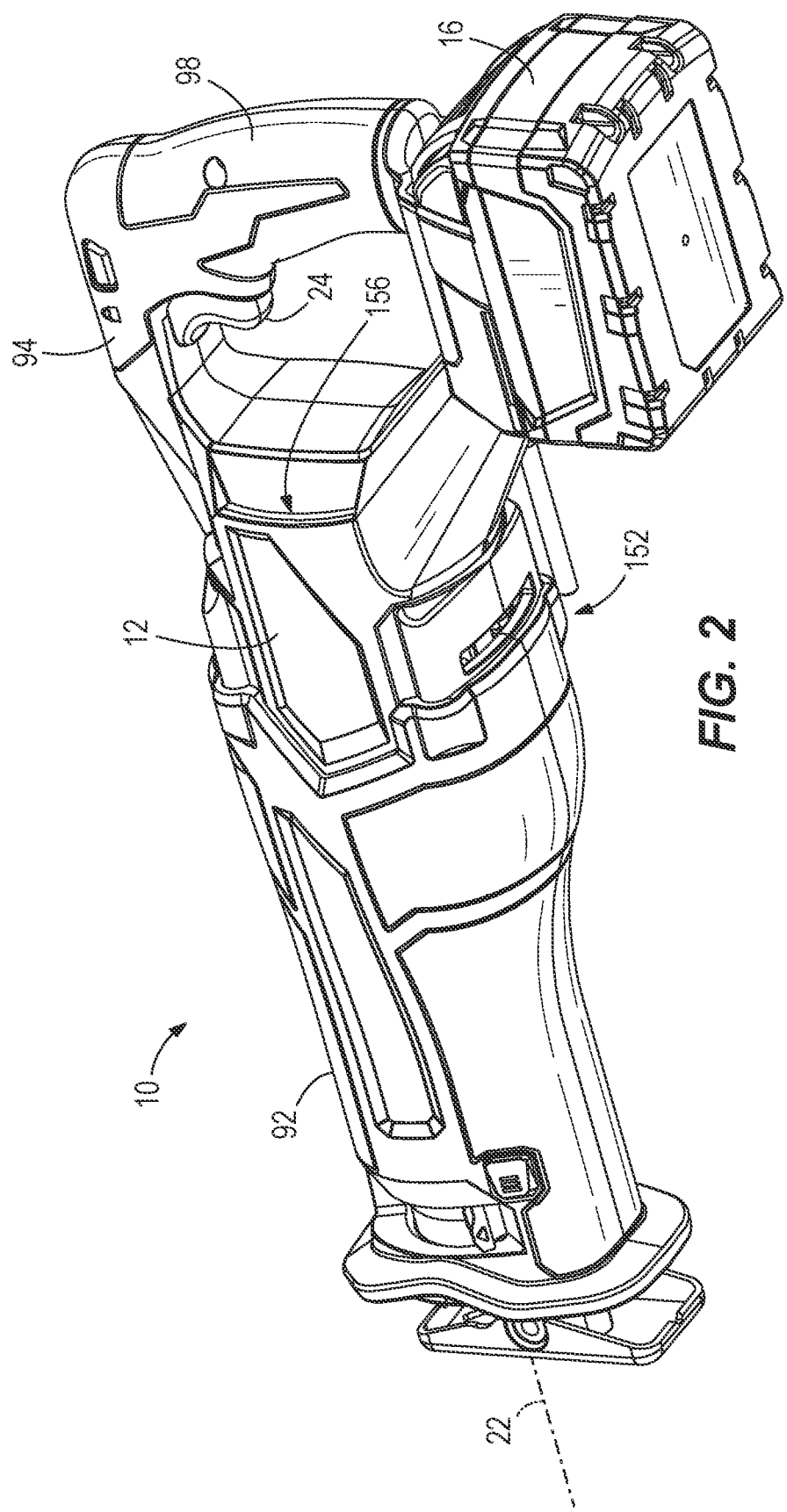
FIG. 2 is another perspective view of the power tool of FIG. 1.

FIGS. 1 and 2 illustrate a power tool 10 (e.g., a saw operable to cut into a workpiece) that includes a housing 12 and a brushless direct current (DC) electric motor 14 (FIG. 3) supported in the housing 12. The motor 14 is electrically coupled to a rechargeable battery pack 16, which is selectively coupled to the housing 12. Using power from the battery pack 16, a motor controller (e.g., one or more microprocessors connected to one or more printed circuit boards) operates the motor 14 to drive a drive mechanism 20 to reciprocate along a blade axis 22 in response to an actuator 24 (e.g., a trigger button) of the power tool 10 being depressed. The illustrated drive mechanism 20 includes a tool holder 26 that selectively couples a saw blade to the power tool 10 for the motor 14 to drive the saw blade to reciprocate along the blade axis 22. In other embodiments, the electric motor 14 may be used in various different tools, such as other power tools (e.g., drills, rotary hammers, pipe threaders, cutting tools, etc.), outdoor tools (e.g., trimmers, pole saws, blowers, etc.), and other electrical devices (e.g., motorized devices, etc.), with the particular tool including an appropriate drive mechanism in order to carry out the specific function of the tool.

The battery pack 16 may include any of a number of different nominal voltages (e.g., 12V, 18V, etc.). The illustrated battery pack 16 is a lithium-ion battery pack, but in other embodiments, the battery pack 16 can be configured having any of a number of different chemistries (e.g., lead-acid, nickel-cadmium, nickel-metal hydride, etc.). Alternatively, the motor 14 may be powered by a remote power source (e.g., a household electrical outlet) through a power cord.

Figure 5:
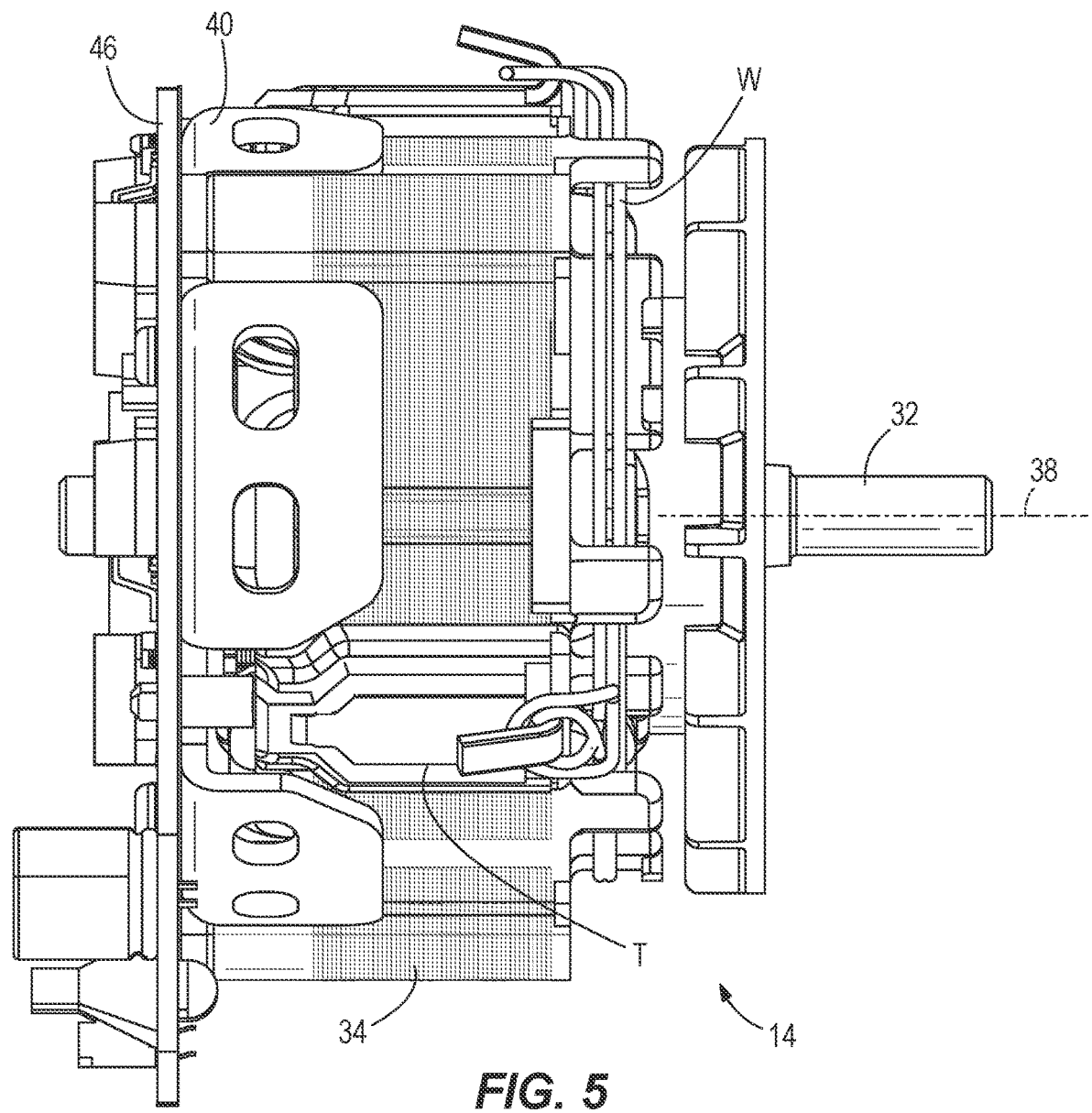
FIG. 5 is a side view of an electric motor of the power tool of FIG. 1.
Figure 6:
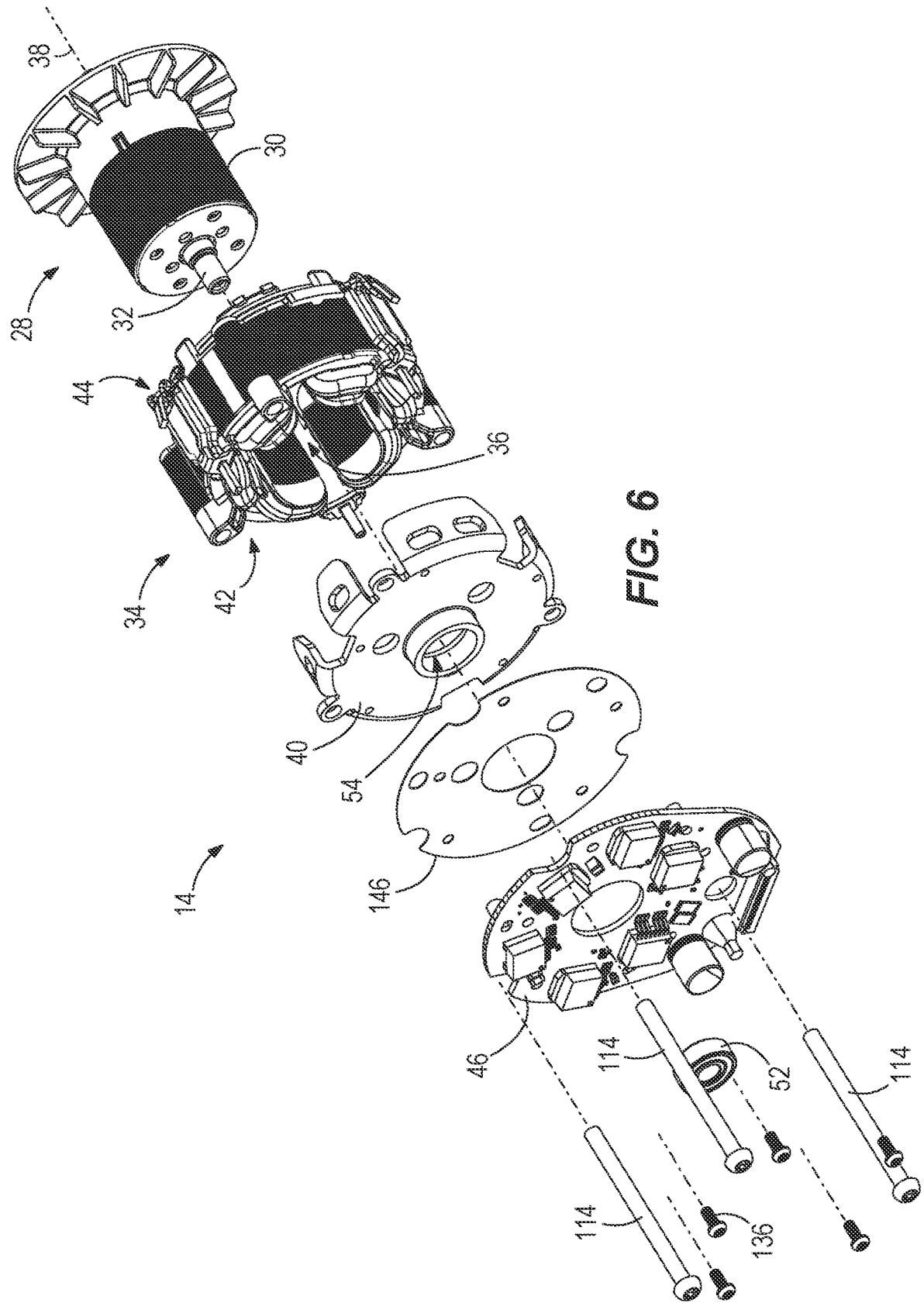
FIGS. 6 and 7 are partially exploded perspective views of the motor of FIG. 5.
Figure 7:
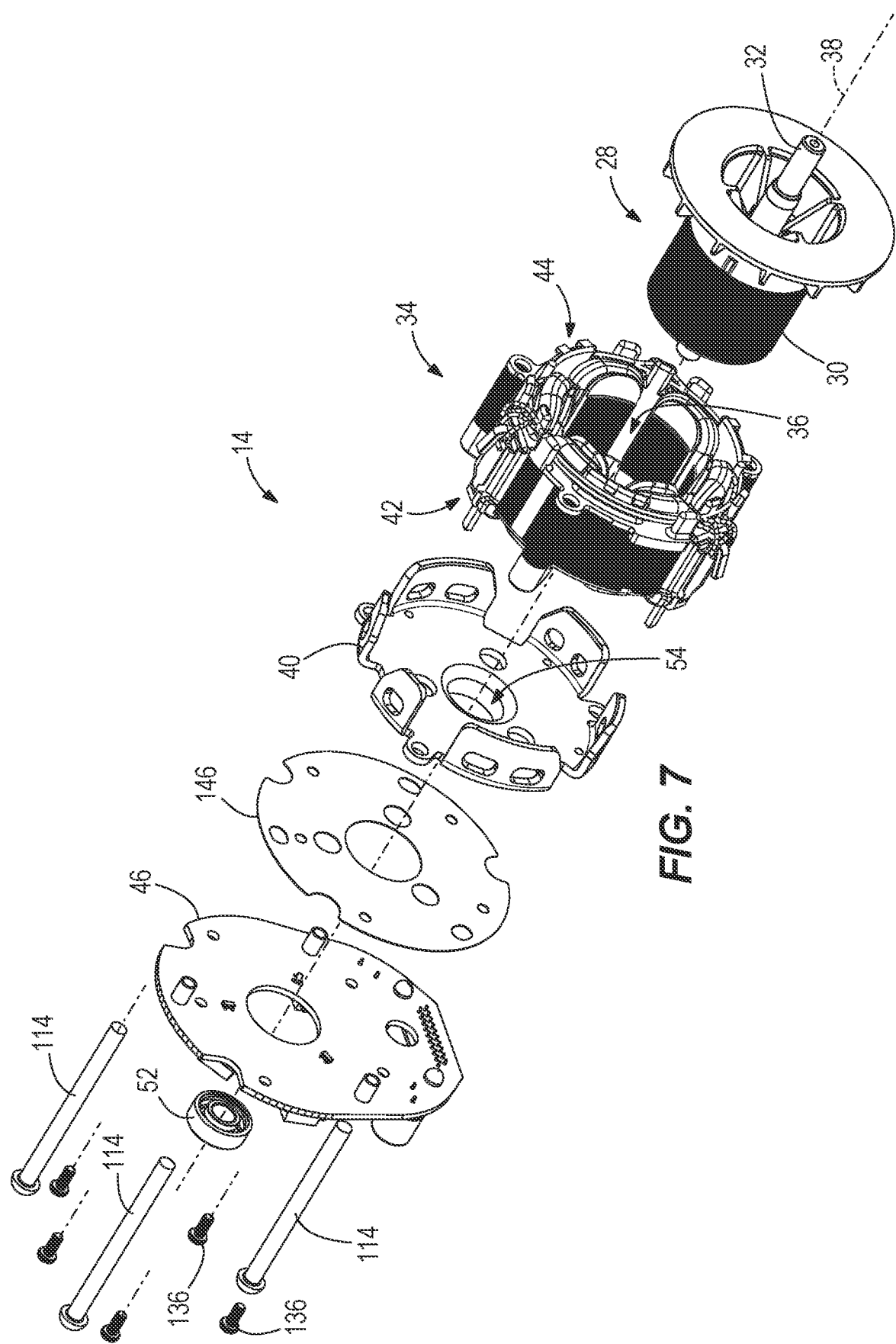
Figure 16:
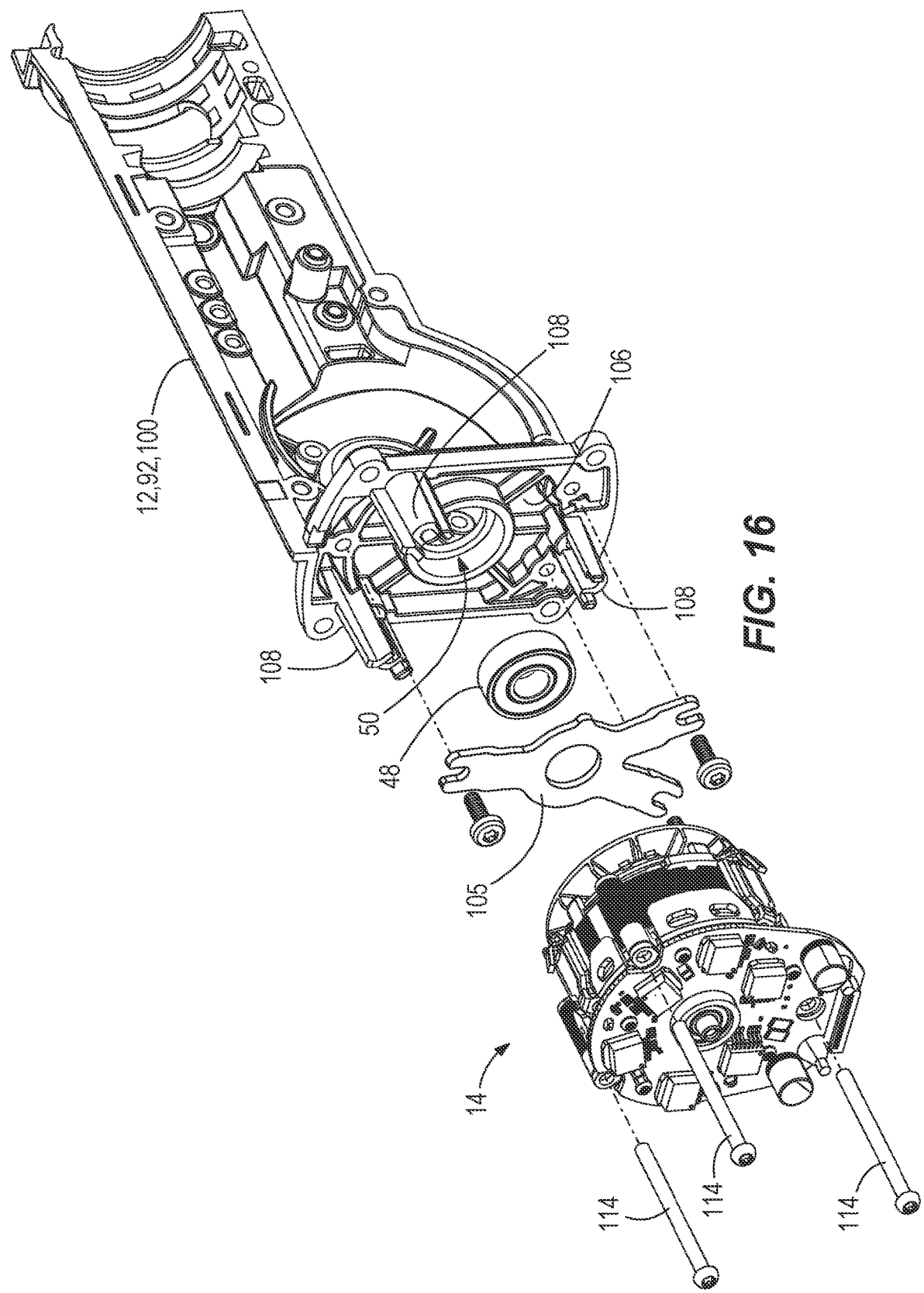
FIG. 16 is a partially exploded perspective view of the motor of FIG. 5 and the gear case of FIG. 15.

With reference to FIGS. 5-7, the illustrated motor 14 includes a molded rotor assembly 28 having a rotor body 30 fixed to an output shaft 32 that is coupled to the drive mechanism 20, a stator assembly 34 having a central cavity 36 that receives the rotor assembly 28 to rotate about a motor axis 38, a heat sink 40 coupled to a rear end 42 of the stator assembly 34 opposite a front end 44, and a printed circuit board (PCB) 46 coupled to the heat sink 40. A front portion of the output shaft 32 is rotatably supported by a first bearing 48 (FIG. 16) which, in the illustrated embodiment, is seated within a front bearing pocket 50 of the housing 12. Likewise, a rear portion of the output shaft 32 is rotatably supported by a second bearing 52 (FIG. 6), which is seated within a rear bearing pocket 54 defined by the heat sink 40. In one embodiment, the second bearing 52 can be press fit into the rear bearing pocket 54 of the heat sink 40.

With reference to FIGS. 8-11, the rotor body 30 includes an integral fan and magnet retention 56 (FIG. 10) formed of an insulative material (e.g., plastic) that is molded to a rotor lamination stack 58. The integral fan and magnet retention 56 includes a fan portion and a magnet retention portion 62 formed opposite the fan portion 60. The fan portion 60 and the magnet retention portion 62 abut opposite ends of the lamination stack 58 to retain permanent magnets 64 (FIG. 10) located within the lamination stack 58.

Figure 10:
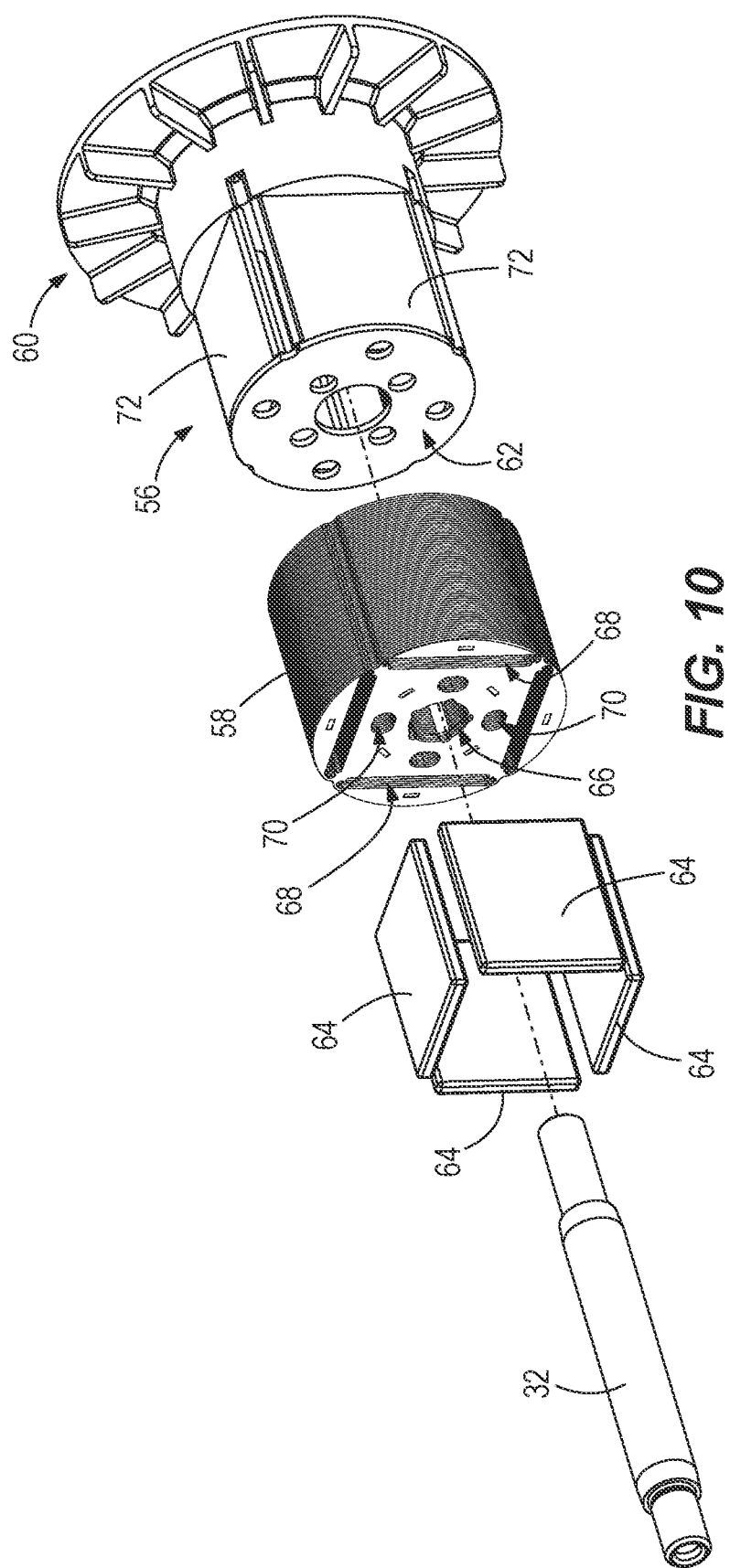
FIG. 10 is an exploded perspective view of the rotor assembly of FIG. 8.
Figure 11:
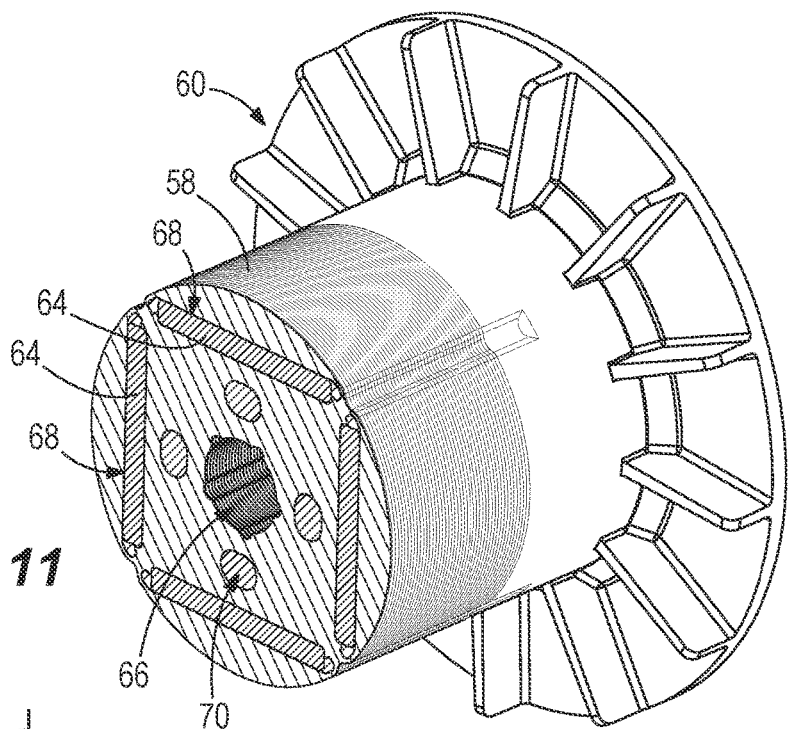
FIG. 11 is a cross-sectional perspective view of the rotor assembly of FIG. 8 with portions removed, taken along line 11-11 of FIG. 9.

The lamination stack 58 defines a longitudinally extending central aperture 66 that receives the output shaft 32 (e.g., by interference fit). Magnet slots 68 (FIG. 10) are formed in the lamination stack 58 and receive the permanent magnets 64. The lamination stack 58 also includes injection channels 70 formed about the central aperture 66 and extending longitudinally between the fan portion 60 and magnet retention portion 62. When the integral fan and magnet retention 56 is molded to the lamination stack 58, the insulative material of the integral fan and magnet retention 56 flows through the channels 70 and joins the fan portion 60 to the magnet retention portion 62. The insulative material also extends around the magnets 64 within the magnet slots 68 to form magnet holding portions 72 (FIG. 10). The magnet holding portions 72 extend through the magnet slots 68 between the fan portion and the magnet retention portion 62, and surround the permanent magnets 64 to retain the magnets 64 within the slots 68.

Figure 12:
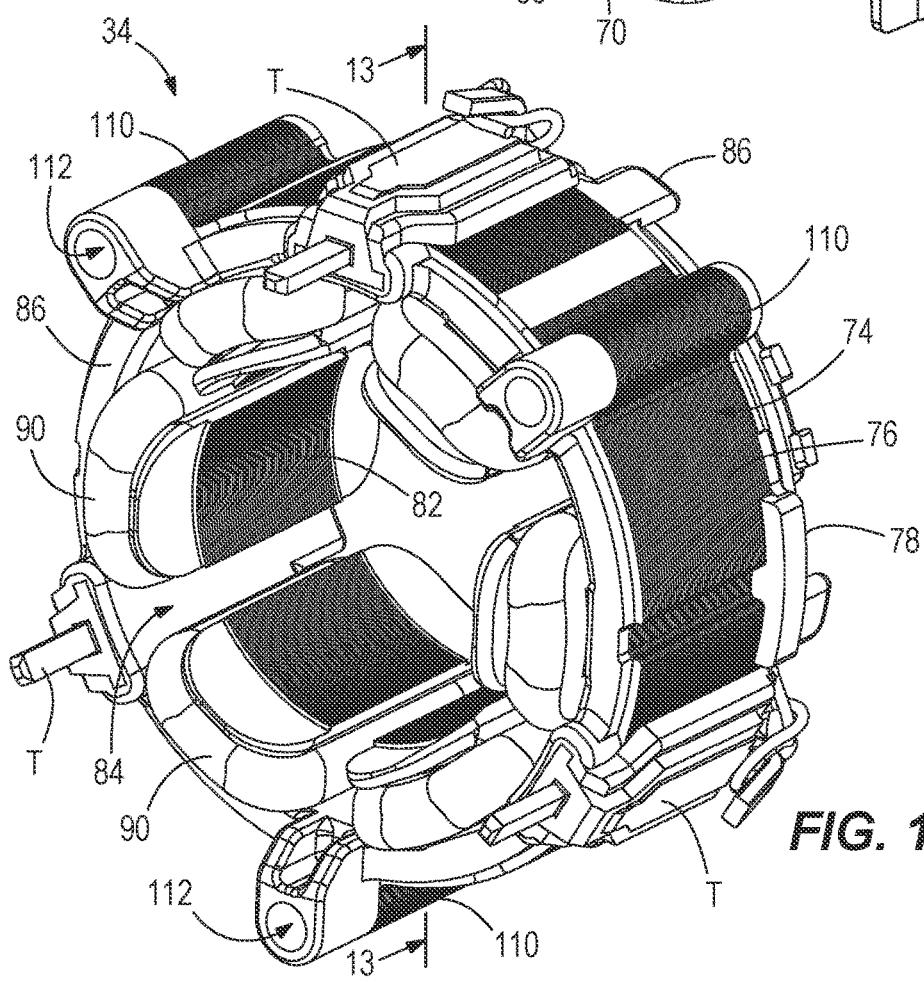
FIG. 12 is a perspective view of a stator assembly of the motor of FIG. 5.
Figure 13:
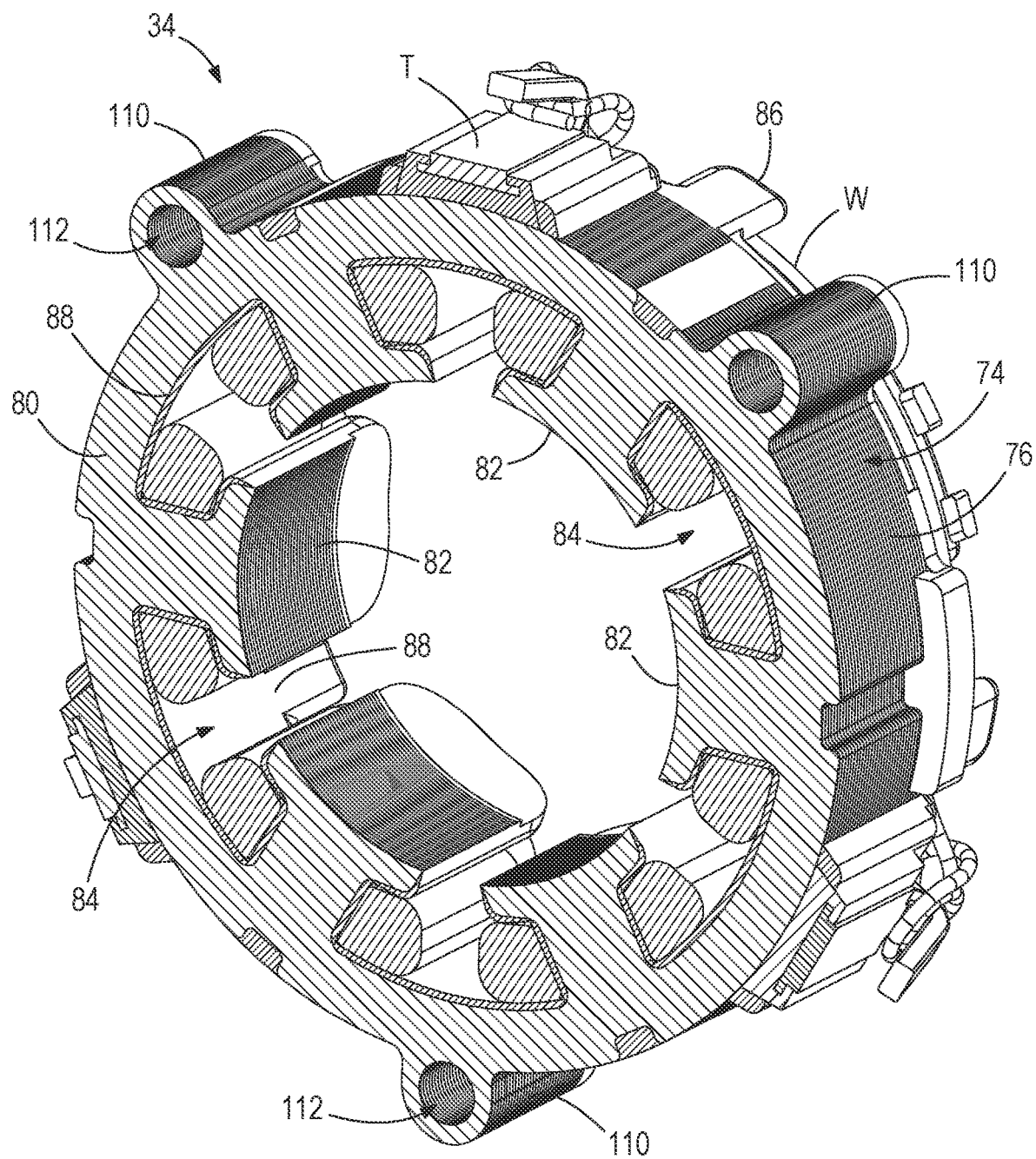
FIG. 13 is a cross-sectional perspective view of the stator assembly of FIG. 12, taken along lines 13-13 of FIG. 12.
Figure 14:
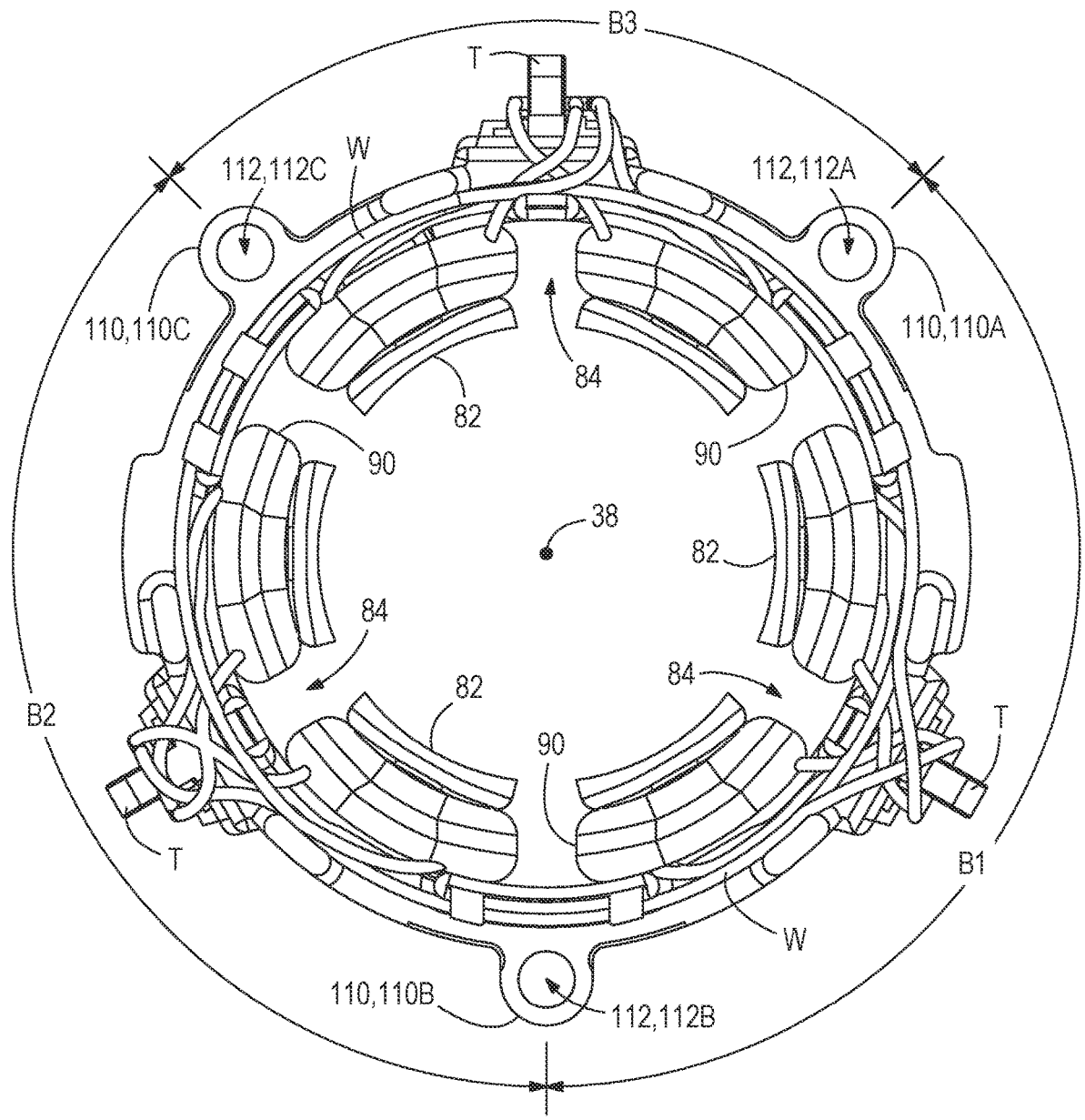
FIG. 14 is a front end view of the stator assembly of FIG. 12.

With reference to FIGS. 12-14, the stator assembly 34 includes a stator body 74 having a lamination stack 76 and a molded insulator member 78 formed of an insulative material (e.g., plastic) that is molded to the lamination stack 76. In the illustrated embodiment, the lamination stack 76 includes an annular yoke 80 and six stator teeth 82 (FIG. 13) extending inwardly in a generally radial direction from the yoke 80. Stator slots 84 are defined between adjacent pairs of the teeth 82. The insulator member 78 includes a pair of end insulators or bobbins 86 disposed at each axial end face of the lamination stack 76, and slot insulators 88 (FIG. 13) extending through the slots 84 to cover the inner surfaces of the slots 84 and connect the pair of bobbins 86.

Windings W (FIG. 14) are routed through the slots 84 and wound about the respective teeth 82 to form coils 90. The windings W are electrically connected to terminals T (FIG. 5), which in turn are electrically connected to the PCB 46 that selectively applies power to the windings W to cause the output shaft 32 to rotate about the motor axis 38 to operate the drive mechanism 20.

Figure 3:
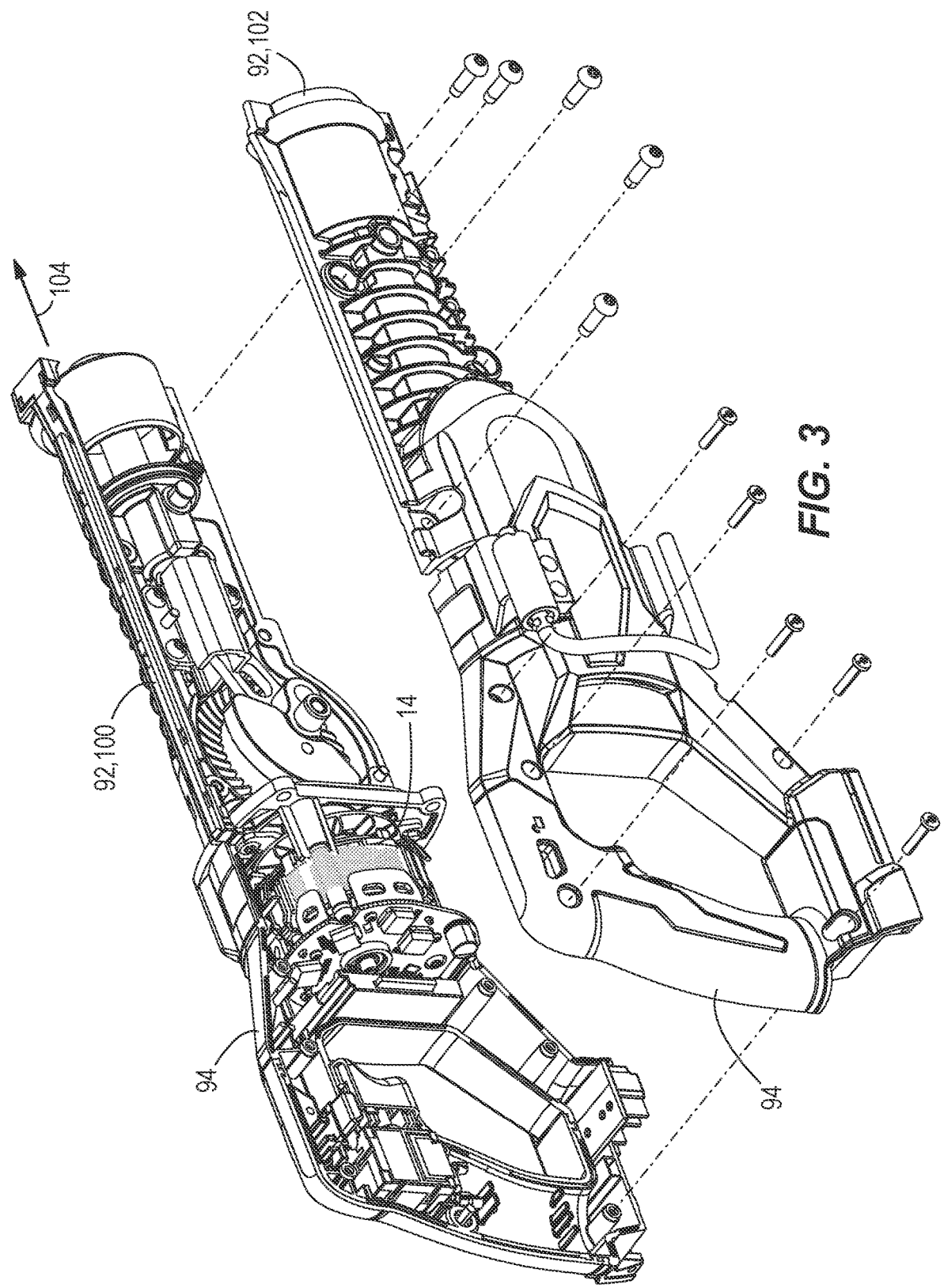
FIG. 3 is a partially exploded perspective view of the power tool of FIG. 1 with portions removed.

With reference to FIGS. 1-4, the housing 12 includes a gear case 92 and a rear housing portion 94 coupled to the gear case 92. The housing 12 also defines a longitudinal axis 96 (FIG. 4) that extends through the gear case 92 and the rear housing portion 94. The rear housing portion 94 includes a D-shaped handle 98 that supports the actuator 24. The gear case 92 is comprised of first and second clamshell halves 100, 102 that are connected together along a mating plane 104 (FIG. 3). In the illustrated embodiment, the clamshell halves 100, 102 are secured together with threaded fasteners (e.g., screws).

Figure 4:
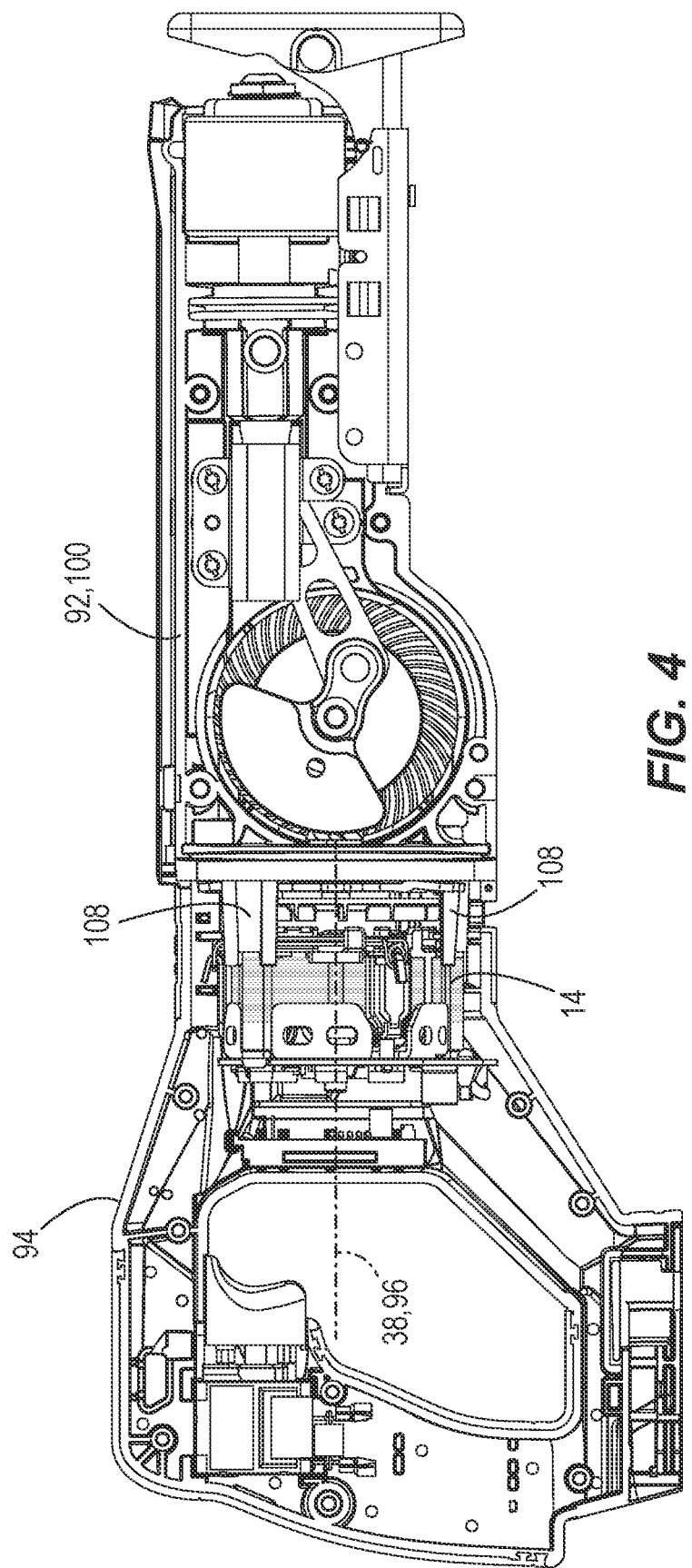
FIG. 4 is a side view of the power tool of FIG. 1 with portions removed.
Figure 15:
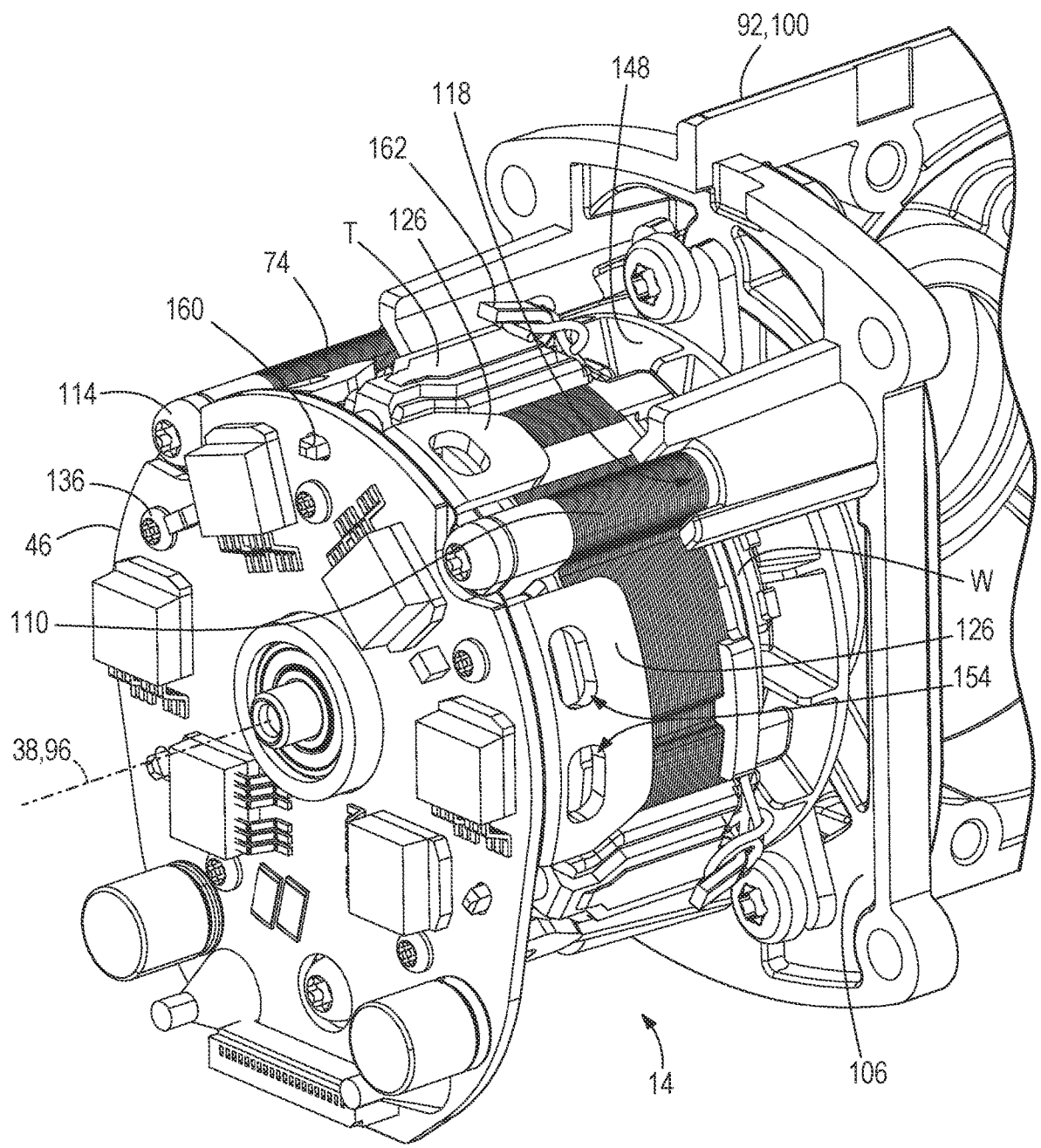
FIG. 15 is a perspective view of the motor of FIG. 5 coupled to a portion of a gear case of the power tool of FIG. 1.

As shown in FIGS. 4 and 15, the motor 14 is positioned within the rear housing portion 94 and affixed to the gear case 92. In the illustrated embodiment, the motor axis 38 of the motor 14 is generally aligned or coaxial with the longitudinal axis 96 of the housing 12. The first clamshell half 100 includes a rear wall 106 that extends generally orthogonal to the longitudinal axis 96. The front bearing pocket 50 (FIG. 16) is formed in the rear wall 106. The first bearing 48 is received into the front bearing pocket 50, and a bearing retainer 105 (FIG. 16) is coupled to the rear wall 106 to retain the first bearing 48 within the front bearing pocket 50.

Figure 17A:
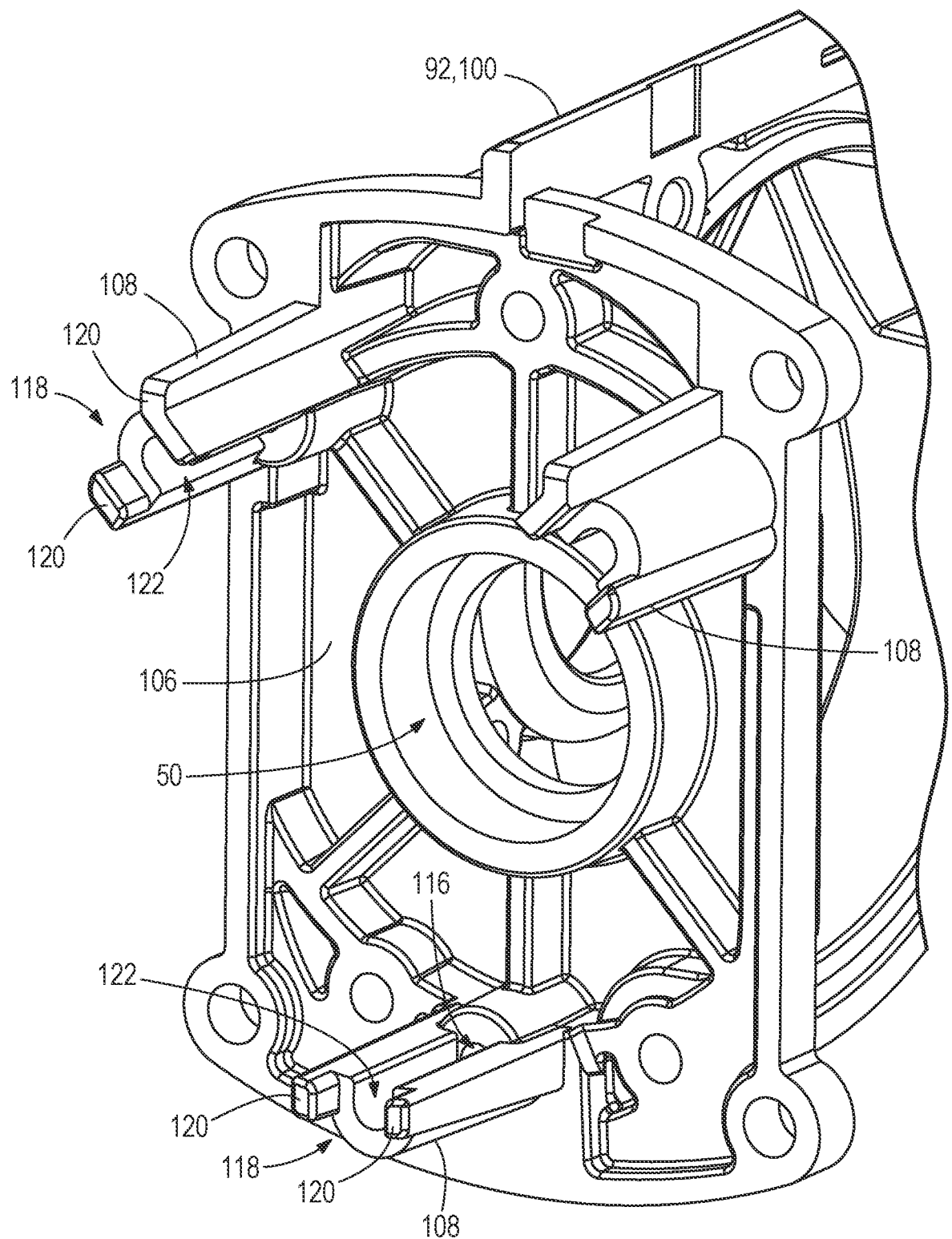
FIG. 17A is a perspective view of a portion of the gear case of FIG. 15.
Figure 17B:
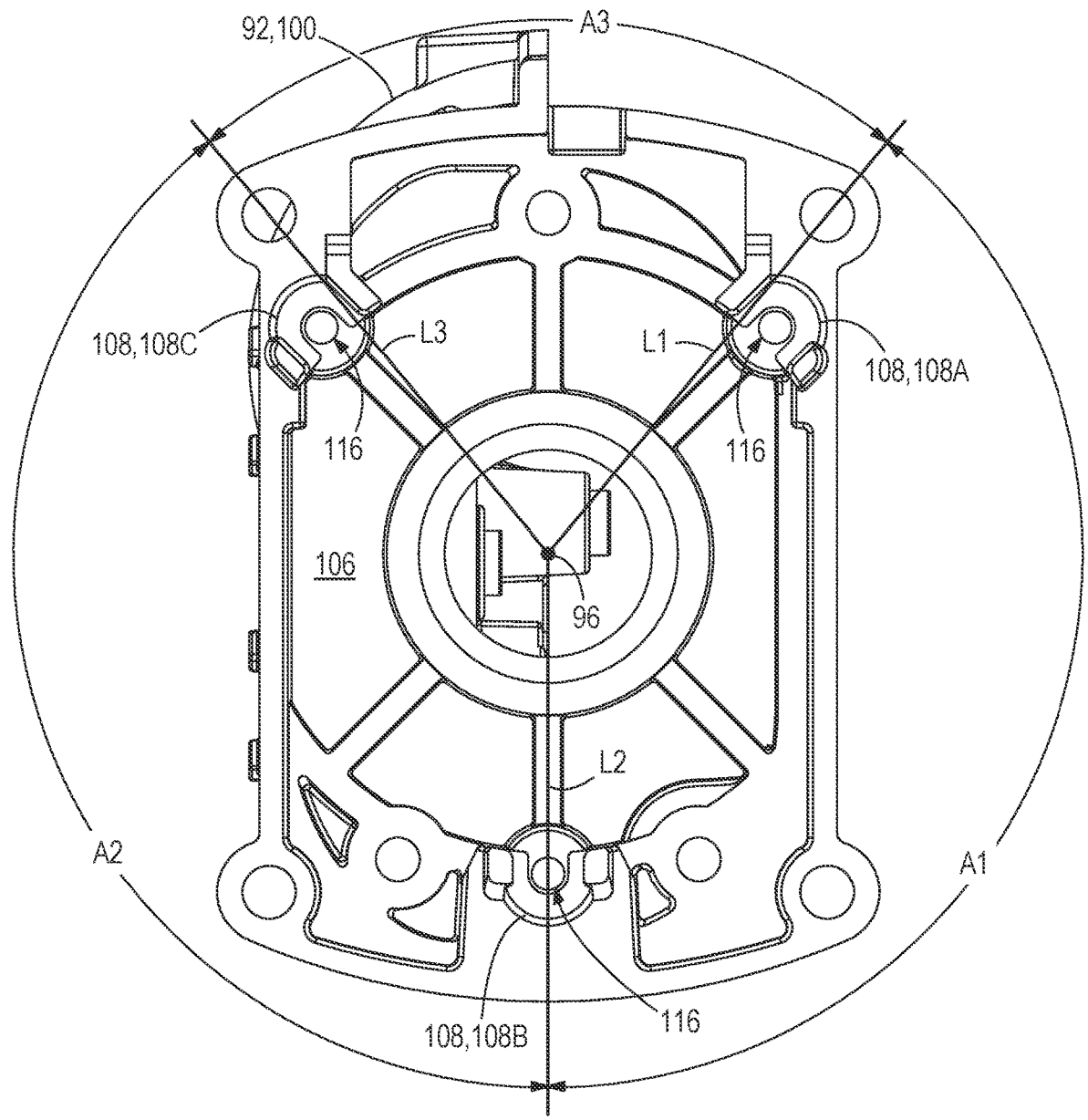
FIG. 17B is an end view of the gear case of FIG. 15.

As shown in FIGS. 4, 17A, and 17B, the motor 14 is supported by motor mounting legs 108 extending from the rear wall 106 toward the rear housing portion 94 along an axial direction generally parallel to the longitudinal axis 96. The mounting legs 108 correspond to axially extending mounting ribs 110 (FIG. 12) projecting radially outward from the stator body 74 and spaced about a circumference thereof. Axially-extending mounting apertures 112 are formed within the mounting ribs 110 and configured to receive fasteners 114 (FIG. 16) for securing the motor 14 to the gear case 92. In the illustrated embodiment, there are three mounting legs 108 projecting from the gear case 92 and corresponding to three mounting ribs 110. In other embodiments, there may be fewer (e.g., two) or more (e.g., four, five, etc.) mounting legs 108 and corresponding mounting ribs 110.

Each mounting leg 108 defines a threaded aperture 116 proximate the rear wall 106, an alignment groove 118 located between two projections or prongs 120 projecting from a distal end, and a channel 122 extending longitudinally between the threaded aperture 116 and the alignment groove 118. The alignment groove 118 receives a portion of the corresponding mounting rib 110 of the stator body 74 (as shown in FIG. 15) to align the motor 14 with respect to the gear case 92 during assembly. The fasteners 114 extend through the mounting apertures 112 of the stator body 74 and within the channels 122 of the mounting legs 108, and thread into the threaded apertures 116 to secure the motor 14 to the gear case 92.

With reference to FIG. 17B, the mounting legs 108 are angularly spaced asymmetrically or at unequal intervals about the longitudinal axis 96. In the illustrated embodiment, the mounting legs 108 include a first mounting leg 108A, a second mounting leg 108B, and a third mounting leg 108C. First, second, and third reference lines L1, L2, and L3 originate at the longitudinal axis 96 and extend to intersect the first, second, and third mounting legs 108A, 108C, and 108C, respectively. The first and second reference lines L1, L2 define a first mounting leg angle A1 therebetween. Similarly, the second and third reference lines L2, L3 define a second mounting leg angle A2, and the first and third reference lines L1, L3 define a third mounting leg angle A3. In other words, the first and second mounting legs 108A, 108B are angularly spaced about the longitudinal axis 96 by the first mounting leg angle A1, the second and third mounting legs 108B, 108C are spaced about the longitudinal axis 96 by the second mounting leg angle A2, and the first and third mounting legs 108A, 108C are spaced about the longitudinal axis 96 by the third mounting leg angle A3. In the illustrated embodiment, the first and second mounting leg angles A1 and A2 are equal to one another, and both differ from the third mounting leg angle A3, i.e., A1=A2≠A3.

With reference to FIG. 14, mounting ribs 110 and corresponding mounting apertures 112 of the stator body 74 are likewise spaced at unequal intervals about the motor axis 38. As shown in FIG. 14, the mounting ribs 110 include first, second, and third mounting ribs 110A, 110B, and 110C defining associated first, second, and third mounting apertures 112A, 112B, and 112C. In a manner similar to that described above, the first and second mounting ribs 110A, 110B are angularly spaced about the motor axis 38 by a first mounting rib angle B1, the second and third mounting ribs 110B, 110C are spaced about the motor axis 38 by a second mounting rib angle B2, and the first and third mounting ribs 110A, 110C are spaced about the motor axis 38 by a third mounting rib angle B3. In the illustrated embodiment, the first and second mounting rib angles B1 and B2 are equal to one another, and both differ from the third mounting rib angle B3, i.e., B1=B2≠B3.

Due to the unequal angular spacing of the mounting legs 108 of the gear case 92 and the corresponding mounting ribs 110 and associated mounting apertures 112 of the stator body 74, as described above, the motor 14 and the gear case 92 only couple together in a single orientation at which the mounting ribs 110 may be partially received into the corresponding alignment grooves 118 as shown in FIG. 15. This ensures that the motor 14 is properly aligned to the gear case 92 during assembly of the power tool 10 and eliminates any risk for misalignment, thus improving the manufacturability of the power tool 10.

Figure 18A:
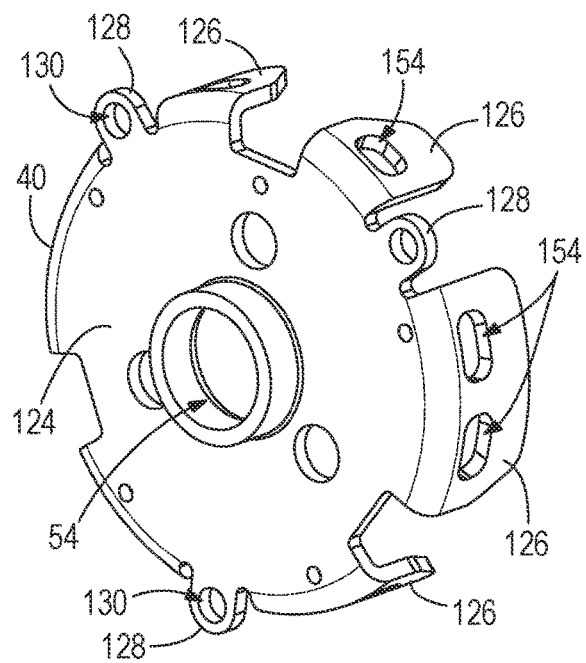
FIGS. 18A and 18B are perspective views of a heat sink of the motor of FIG. 5.
Figure 18B:
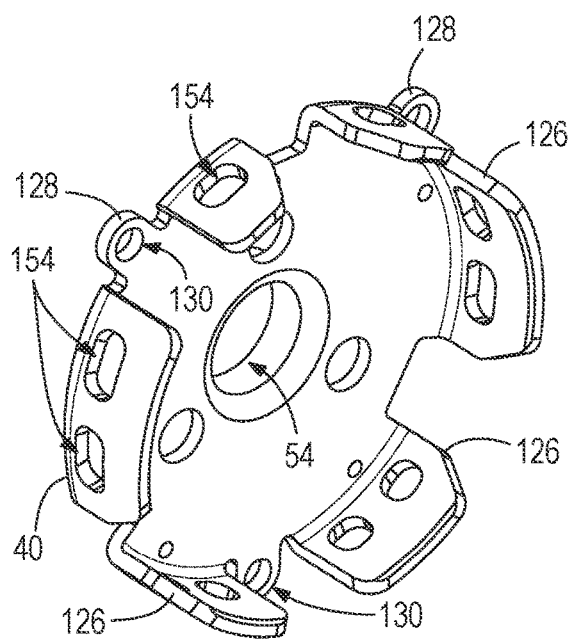
Figure 18C:
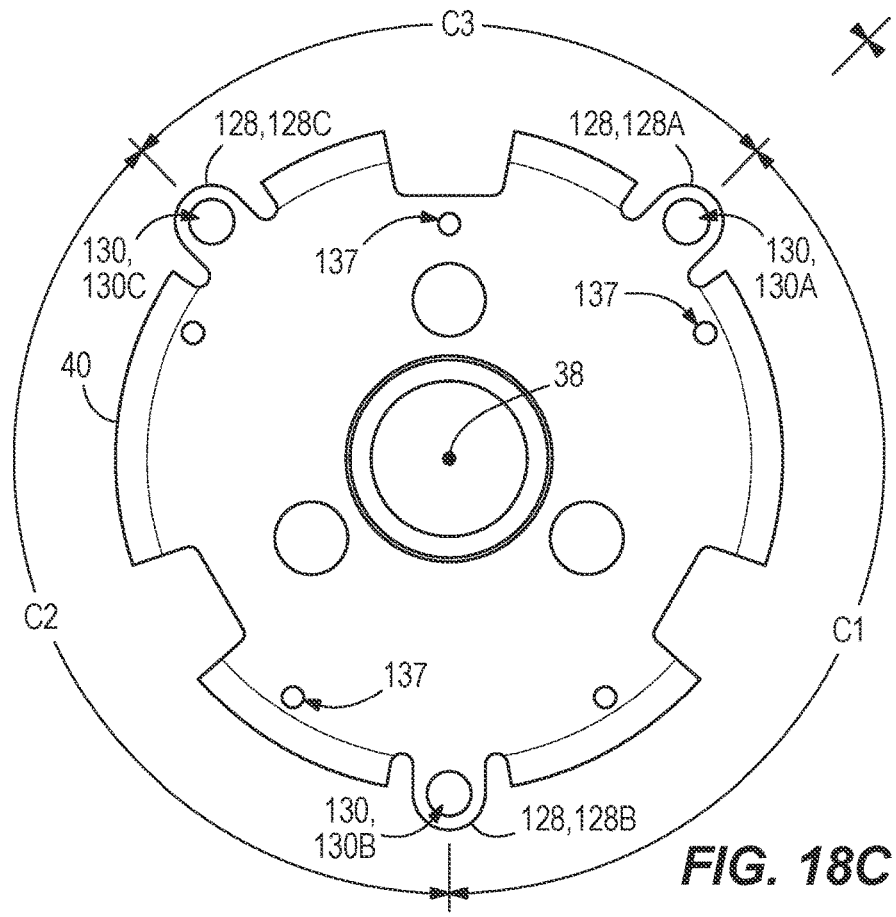
FIG. 18C is an end view of the heat sink of FIGS. 18A and 18B.

With reference to FIGS. 18A-18C, the heat sink 40 is generally cup-shaped and includes an end wall 124 that mates with the PCB 46 (FIG. 6) and includes the rear bearing pocket 54, and axially-extending cooling flanges 126 spaced about a periphery of the end wall 124 and extending toward the stator body 74. Mounting tabs 128 extend radially outward from the perimeter of the end wall 124 and define fastener apertures 130 corresponding to the mounting ribs 110 and associated mounting apertures 112 of the stator body 74. The mounting tabs 128 include first, second, and third mounting tabs 128A, 128B, and 128C defining associated first, second, and third fastener apertures 130A, 130B, and 130C. In a manner similar to that described above, the first and second mounting tabs 128A, 128B are angularly spaced about the motor axis 38 by a first mounting tab angle C1, the second and third mounting tabs 128B, 128C are spaced about the motor axis 38 by a second mounting tab angle C2, and the first and third mounting tabs 128A, 128C are spaced about the motor axis 38 by a third mounting tab angle C3. In the illustrated embodiment, the first and second mounting tab angles C1 and C2 are equal to one another, and both differ from the third mounting tab angle C3, i.e., C1=C2≠C3.

Due to the unequal angular spacing of the mounting tabs 128 and associated fastener apertures 130 of the heat sink 40, and of the corresponding mounting ribs 110 and associated mounting apertures 112 of the stator body 74, as described above, the heat sink 40 can only be coupled to the stator body 74 in a single orientation at which the fastener apertures 130 align with the mounting apertures 112. This ensures that the heat sink 40 and the stator body 74 only couple together in a single orientation at which the cutouts 138 align with the corresponding mounting ribs 110 and associated mounting apertures 112 (FIG. 14). This ensures that the heat sink 40 is properly aligned to the stator body 74 during assembly of the motor 14 and eliminates any risk for misalignment, thus improving the manufacturability of the motor 14 and the power tool 10.

When the gear case 92 is assembled with the motor 14, the fasteners 114 extend through the fastener apertures 130 and the mounting apertures 112, and thread into the threaded apertures 116 of the gear case 92. By tightening the fasteners 114, the heat sink 40 and the mounting legs 108 apply a clamping force to the stator body 74, thereby fixing the stator body 74 to the heat sink 40 and to the mounting legs 108.

With reference to FIGS. 15 and 19A-19C, the PCB 46 is coupled to the heat sink 40 via PCB fasteners 136. Specifically, the PCB 46 includes mounting apertures 134, and the heat sink 40 includes corresponding threaded apertures 137 (FIG. 18C) so that when the PCB 46 is placed against the heat sink 40, the mounting apertures 134 and the threaded apertures 137 align and receive the PCB fasteners 136 to secure the PCB 46 to the heat sink 40.

With continued reference to FIGS. 15 and 19A-19C, the PCB 46 also includes fastener cutouts 138 corresponding to the fasteners 114 securing the motor 14 to the gear case 92. The fastener cutouts 138 permit the fasteners 114 to pass through without engaging the PCB 46, thus reducing strain on the PCB 46 that would otherwise result from any forces exerted on the PCB 46 by the fasteners 114.

Figure 19A:
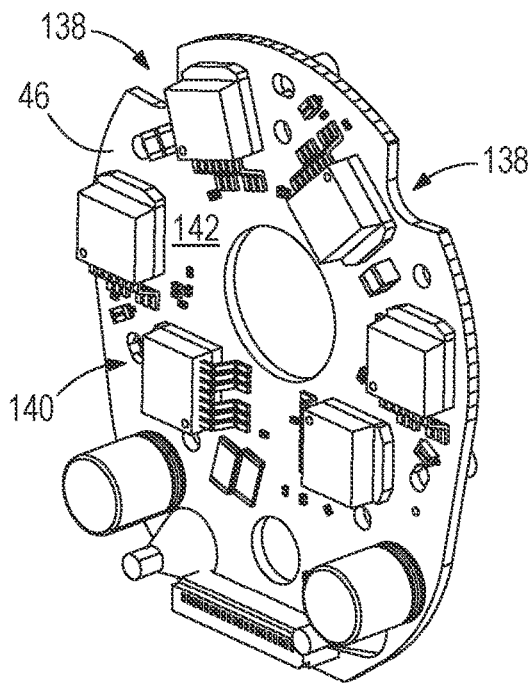
FIGS. 19A and 19B are perspective views of a printed circuit board (PCB) of the motor of FIG. 5.
Figure 19B:
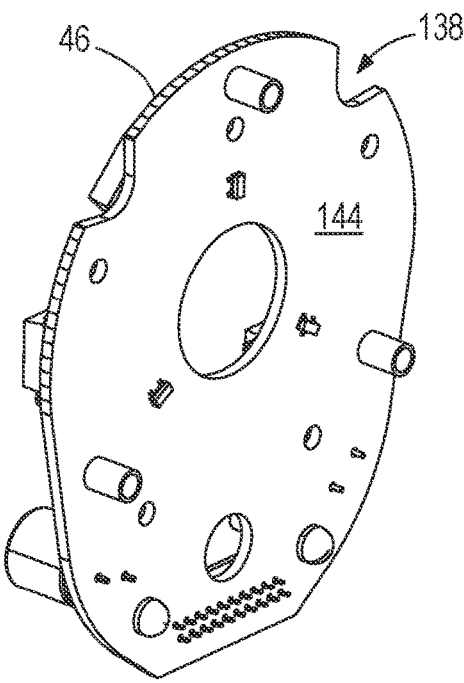
Figure 19C:
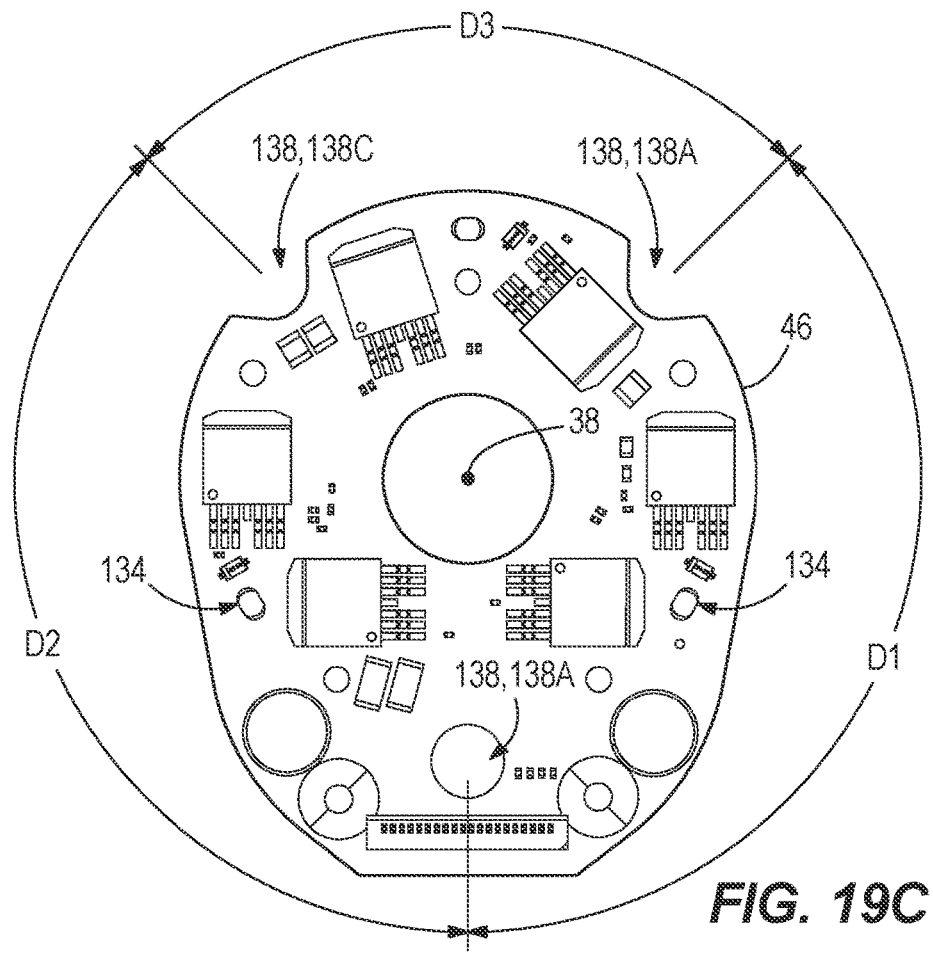
FIG. 19C is an end view of the PCB of FIGS. 19A and 19B.

Moreover, the cutouts 138 are angularly spaced about the motor axis 38 asymmetrically or at unequal intervals, in a manner similar to that described above with respect to the mounting legs 108, the mounting ribs 110 and associated mounting apertures 112, and the mounting tabs 128 and associated fastener apertures 130. As shown in FIG. 19C, the cutouts 138 include first, second, and third cutouts 138A, 138B, and 138C. In a manner similar to that described above, the first and second cutouts 138A, 138B are angularly spaced about the motor axis 38 by a first cutout angle D1, the second and third cutouts 138B, 138C are spaced about the motor axis 38 by a second cutout angle D2, and the first and third cutouts 138A, 138C are spaced about the motor axis 38 by a third cutout angle D3. In the illustrated embodiment, the first and second cutout angles D1 and D2 are equal to one another, and both differ from the third cutout angle D3, i.e., D1=D2≠D3. This ensures that the PCB 46 and the heat sink 40 only couple together in a single orientation at which the cutouts 138 align with the corresponding mounting ribs 110 and associated mounting apertures 112 (FIG. 14) of the stator body 74, and eliminates any risk for misalignment, thus improving the manufacturability of the motor 14 and the power tool 10.

The PCB 46 includes heat-generating components 140 (e.g., semiconductor FETs, current sense resistors, thermistors, capacitors, diodes, voltage sensors, etc.) supported on a first side 142 of the PCB 46. As such, the heat-generating components 140 face away from the stator body 74. A second side 144 of the PCB 46 faces toward the heat sink 40 and is in direct contact with one side of a thermal pad 146 (FIG. 6) (e.g., a highly thermal conductive member such as copper, aluminum, etc.) and another side of the thermal pad 146 is in direct contact with the end wall 124 of the heat sink 40. In other embodiments, the thermal pad 146 can be omitted such that the PCB 46 directly contacts the heat sink 40.

Figure 8:
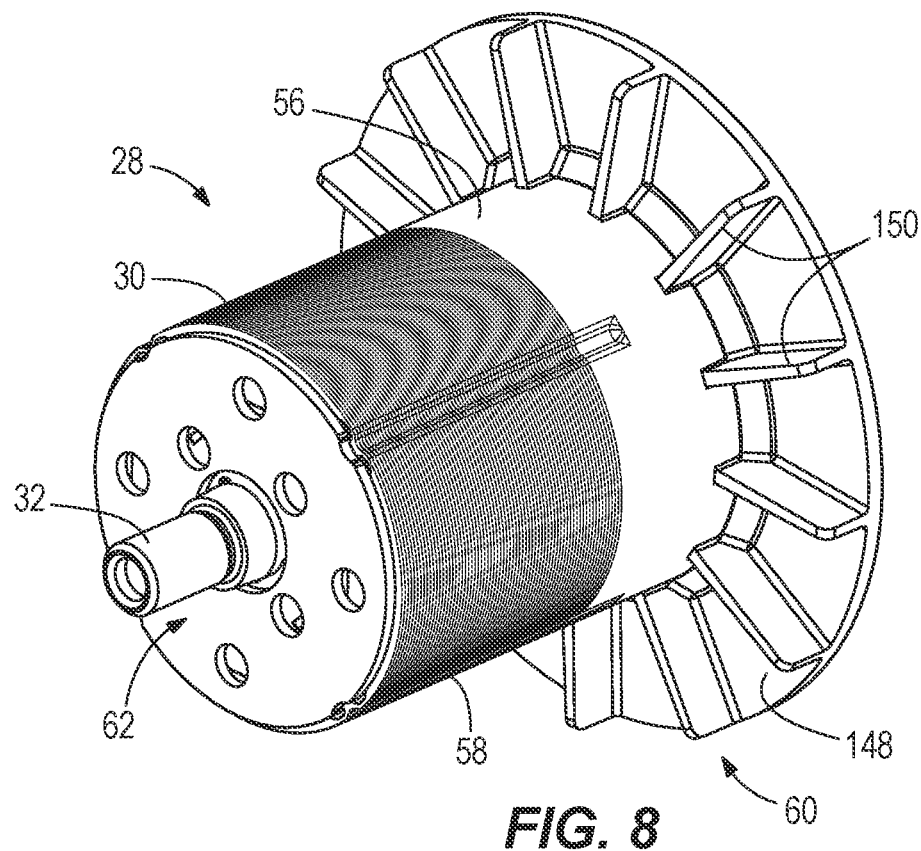
FIG. 8 is a perspective view of a rotor assembly of the motor of FIG. 5.
Figure 9:
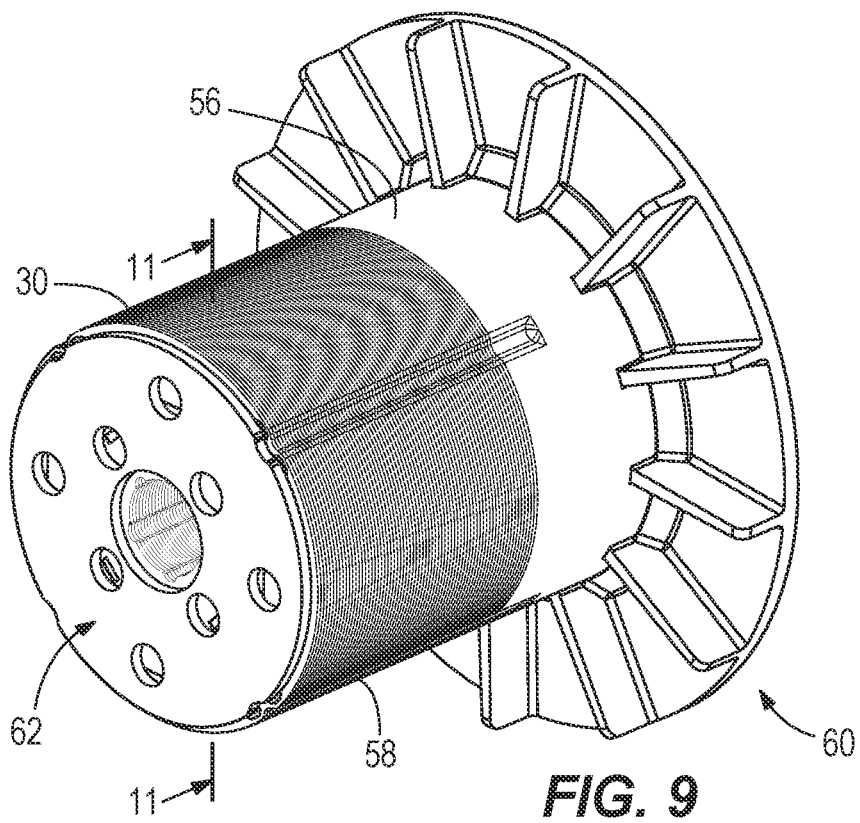
FIG. 9 is another perspective view of the rotor assembly of FIG. 8 with portions removed.

With reference to FIGS. 8 and 15, the fan portion 60 of the rotor body 30 includes an impeller 148. When the power tool 10 is assembled with the motor 14, the impeller 148 is positioned between the stator body 74 and the rear wall 106 of the gear case 92. The illustrated impeller 148 includes cooling blades 150 extending toward the stator body 74 and radially aligned with an exhaust aperture 152 (FIG. 2) formed through the rear housing portion 94. In turn, the cooling flanges 126 of the heat sink 40 include airflow apertures 154 (FIGS. 18A and 18B) formed therein and located proximate inlet apertures 156 (FIG. 2) formed through the rear housing portion 94. The cooling flanges 126 of the heat sink 40 increase the thermal surface area and mass of the heat sink 40, which improves heat dissipation and removal from the PCB 46. Moreover, the airflow apertures 154 within the cooling flanges 126 allow for a cooling airflow generated by the impeller 148 to pass through and over the heat sink 40 to improve thermal energy removal and reduce the amount of recirculated air.

In operation, the battery pack 16 provides DC power to the heat-generating components 140 of the PCB 46. As the electrical current travels through the PCB 46, the electrical current provides operating power to the heat-generating components 140 so that power from the battery pack 16 is selectively applied to the stator assembly 34 to cause rotation of the output shaft 32 about the motor axis 38 to operate the drive mechanism 20. As the electrical current passes through the heat-generating components 140, the components 140 generate heat (i.e., thermal energy), which if not dissipated, could otherwise impair the performance of the motor 14. The heat sink 40 removes thermal energy from the PCB 46, and directs the thermal energy away from the stator body 74 and the rotor assembly 28. In particular, the thermal energy generated by the heat-generating components 140 dissipates through the thermal pad 146 and into the end wall 124, a portion of which is ultimately dissipated by convection (at least partially) occurring at the cooling flanges 126.

Moreover, when the motor 14 is actively operating, the impeller 148 of the fan portion 60 rotates about the motor axis 38 to induce an airflow through the motor 14. In particular, as the output shaft 32 rotates, the airflow enters the rear housing portion 94 via the inlet apertures 156 and flows into the motor 14 through the airflow apertures 154 formed in the cooling flanges 126. The airflow draws heat away from the heat sink 40, continues to travel forwardly through the central cavity 36 between the stator body 74 and the rotor body exits the motor 14 adjacent the impeller 148, and exhausts out of the rear housing portion 94 through the exhaust aperture 152.

Figure 20:
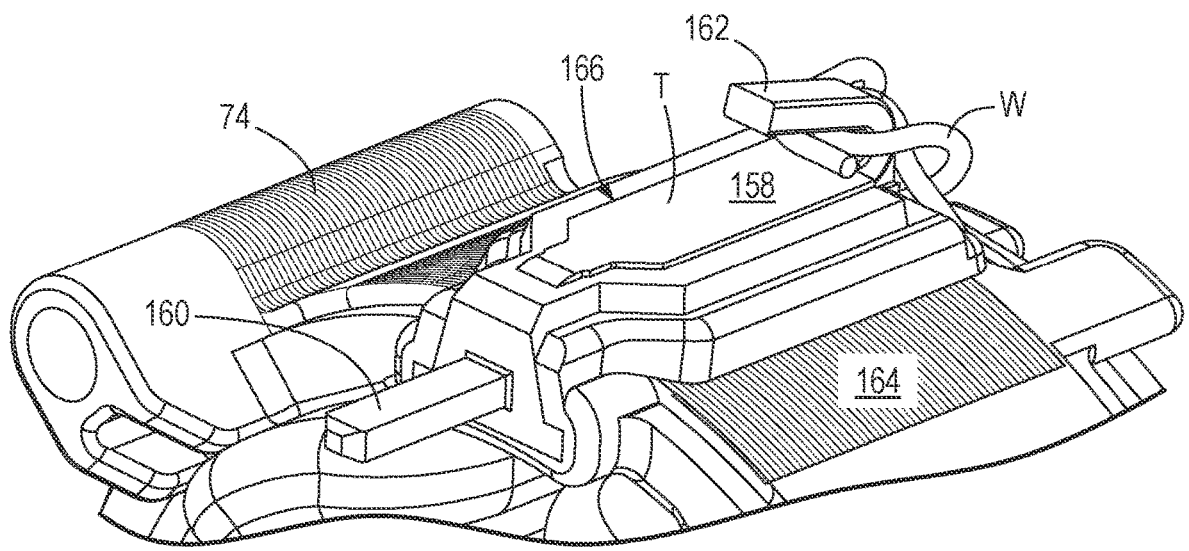
FIG. 20 is a partial perspective view of the stator assembly of FIG. 12.
Figure 21:
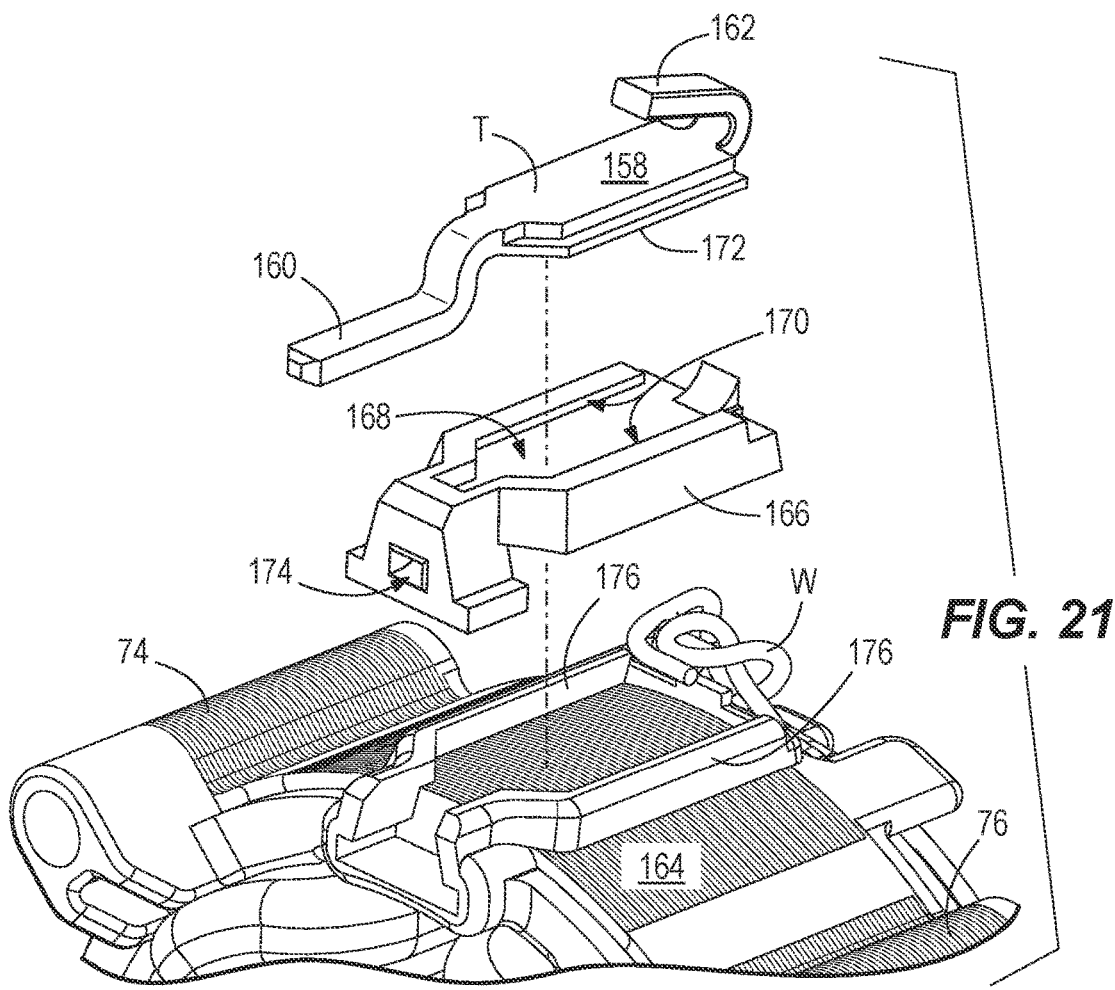
FIG. 21 is a partially exploded partial perspective view of the stator assembly of FIG. 12.

As shown in FIG. 12, in the illustrated embodiment, the motor 14 includes three terminals T that are longitudinally arranged along an outer periphery of the stator body 74 and spaced apart from one another in the circumferential direction at generally equal intervals. With reference to FIGS. 20 and 21, each terminal T comprises an elongated conductive member formed from, e.g., copper, brass, etc. As mentioned above, the terminals T are electrically connected to the windings W at the fan end or front end 44 of the stator assembly 34, and are electrically connected to the PCB 46 at the board end or rear end 42 of the stator assembly 34 to conduct DC current between the PCB 46 and the windings W.

In the illustrated embodiment, each terminal T includes a central plate 158, a connecting portion 160 extending from the central plate 158 and electrically coupled to the PCB 46 at the rear end 42, and a hook portion or tang 162 extending from the central plate 158 opposite the connecting portion 160 and configured to engage the windings W at the front end 44. Each tang 162 extends away from the central plate 158, and then bends backward toward the central plate 158 to form a hook shape. The windings W wrap around the tang 162 to electrically connect to the terminals T at the front end 44 of the stator assembly 34.

With continued reference to FIGS. 20 and 21, each terminal T is attached to a circumferential outer surface 164 of the stator body 74 via a thermal set or attachment member 166. The attachment member 166 includes a receiving portion 168 having grooves 170 that receive rails 172 formed on the central plate 158, and a channel 174 that receives a portion of the connecting portion 160 to secure the terminal T to the attachment member 166. The molded insulator member 78 of the stator body 74 includes retaining walls 176 extending longitudinally along the circumferential outer surface 164 of the lamination stack 76. The retaining walls 176 engage the attachment member 166 to secure the attachment member to the stator body 74.

To secure each terminal T to the stator body 74, first the terminal T is insert molded to the attachment member 166. Then, the combined terminal T and attachment member 166 is subsequently insert molded onto the stator body 74 (i.e., during molding process by which the insulator member 78 is molded to the lamination stack 76).

Various features of the disclosure are set forth in the following claims.

What is claimed is:
1. An electric motor assembly comprising:
  a circuit board;
  a rotor assembly;
  a stator assembly having a first end coupled to the circuit board and a second end opposite the first end, the stator assembly including
    a stator body having a plurality of inwardly projecting teeth,
    windings wrapped about the stator body to form a plurality of coils, and
    a terminal coupled to an outer periphery of the stator body and extending longitudinally between the first end and the second end, the terminal being coupled to the circuit board at the first end and being coupled to the windings at the second end to electrically connect the windings to the circuit board; and a heat sink positioned between the stator assembly and the circuit board, the heat sink including a plurality of axially extending cooling flanges;

wherein the terminal is molded to an attachment member, and the attachment member is molded to the outer periphery of the stator body.

2. The electric motor assembly of claim 1, wherein the terminal includes a central plate portion, a connecting portion extending from the central plate portion and electrically coupled to the circuit board at the first end, and a hook portion extending from the central plate portion and configured to engage the windings at the second end.

3. The electric motor assembly of claim 1, wherein the heat sink is in thermal contact with the circuit board, wherein the heat sink includes an end wall defining a bearing pocket, and wherein the plurality of axially extending cooling flanges extend from a periphery of the end wall.

4. The electric motor assembly of claim 3, wherein each cooling flange defines an airflow aperture.

5. The electric motor assembly of claim 1, wherein the terminal includes a connecting portion that protrudes through the circuit board.

6. The electric motor assembly of claim 5, wherein the connecting portion is defined at the first end, and wherein the terminal further includes a hook portion defined at the second end and engaged with the windings.

7. The electric motor assembly of claim 1, wherein the stator body includes an insulator member having a retaining wall that engages the attachment member to secure the attachment member to the stator body.

8. An electric motor assembly comprising:
a circuit board;
a rotor assembly;
a stator assembly having a first end coupled to the circuit board and a second end opposite the first end, the stator assembly including
a stator body having a plurality of teeth,
windings wrapped about the stator body to form a plurality of coils, and
a terminal configured to electrically connect the windings to the circuit board; and
a heat sink positioned between the stator assembly and the circuit board, the heat sink including a plurality of axially extending cooling flanges.

9. The electric motor assembly of claim 8, wherein the heat sink further includes an end wall, and wherein each cooling flange extends from a periphery of the end wall.

10. The electric motor assembly of claim 8, wherein the heat sink further includes an end wall that defines a bearing pocket.

11. The electric motor assembly of claim 10, further comprising a bearing received within the bearing pocket that rotatably supports the rotor assembly.

12. The electric motor assembly of claim 8, wherein each cooling flange defines an airflow aperture.

13. The electric motor assembly of claim 8, wherein the terminal includes a connecting portion that protrudes through the circuit board.

14. The electric motor assembly of claim 13, wherein the connecting portion is located at the first end, and wherein the terminal further includes a hook portion located at the second end and engaged with the windings.

15. An electric motor assembly comprising:
a circuit board;
a rotor assembly;
a stator assembly having a first end coupled to the circuit board and a second end opposite the first end, the stator assembly including
a stator body having a plurality of teeth,
windings wrapped about the stator body to form a plurality of coils, and
a terminal coupled to an outer periphery of the stator body and extending longitudinally between the first end and the second end, the terminal being coupled to the circuit board at the first end and being coupled to the windings at the second end to electrically connect the windings to the circuit board; and
a heat sink positioned between the stator assembly and the circuit board, the heat sink including a plurality of axially extending cooling flanges, wherein the heat sink is in thermal contact with the circuit board.

16. The electric motor assembly of claim 15, wherein the terminal is secured to an attachment member, and wherein the attachment member is secured to the outer periphery of the stator body.

17. The electric motor assembly of claim 16, wherein the stator body includes an insulator member having a retaining wall that engages the attachment member to secure the attachment member to the stator body.

18. The electric motor assembly of claim 16, wherein the terminal is insert molded to the attachment member.

19. The electric motor assembly of claim 18, wherein the attachment member is insert molded to the stator body.

20. The electric motor assembly of claim 15, wherein the heat sink includes an end wall that defines a bearing pocket in which a bearing is received to rotatably support the rotor assembly.

* * * * *